United States Patent
Carlton et al.

(10) Patent No.: US 12,469,342 B2
(45) Date of Patent: Nov. 11, 2025

(54) SYSTEMS AND METHODS FOR SECURING PRIVATE USER DATA BASED ON GPS

(71) Applicant: Ford Global Technologies, LLC, Dearborn, MI (US)

(72) Inventors: Jason Carlton, Waterford, MI (US); Priyank Shah, West Bloomfield, MI (US); Hafiz Malik, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 288 days.

(21) Appl. No.: 18/298,974

(22) Filed: Apr. 11, 2023

(65) Prior Publication Data

US 2024/0346863 A1    Oct. 17, 2024

(51) Int. Cl.
*G07C 5/08* (2006.01)
*B60W 40/08* (2012.01)

(52) U.S. Cl.
CPC ............. *G07C 5/085* (2013.01); *B60W 40/08* (2013.01); *G07C 5/0816* (2013.01); *B60W 2540/043* (2020.02)

(58) Field of Classification Search
None
See application file for complete search history.

(56) References Cited

U.S. PATENT DOCUMENTS

| | | | |
|---|---|---|---|
| 9,340,155 B2 | 5/2016 | Pisz et al. | |
| 9,891,907 B2 | 2/2018 | Searle et al. | |
| 10,111,272 B1 | 10/2018 | Withers et al. | |
| 10,303,653 B2 | 5/2019 | Martin et al. | |
| 10,620,391 B2 | 4/2020 | Hikosaka | |
| 11,113,415 B1 | 9/2021 | Amico | |
| 2003/0033175 A1* | 2/2003 | Ogura | G06Q 10/02 705/5 |

(Continued)

FOREIGN PATENT DOCUMENTS

| | | | |
|---|---|---|---|
| JP | 2010145330 A | * | 7/2010 |
| KR | 20220056717 A | * | 5/2022 |

OTHER PUBLICATIONS

English translation of JP2010145330A, retrieved from Espacenet on Mar. 20, 2025 (Year: 2025).*

*Primary Examiner* — Amelia Vorce
(74) *Attorney, Agent, or Firm* — Christopher Storms; McCoy Russell LLP

(57) ABSTRACT

Methods and systems are provided for deleting a user profile and pairing data stored in memory of an in-vehicle computing system to maintain user privacy and data security. In one method, the method includes deleting at least one user profile and corresponding pairing data upon receiving a deletion request, wherein the in-vehicle computing system is configured to operate in a rental mode or a non-rental mode, and wherein a pre-set trigger varies according to the rental mode or the non-rental mode. In another method, the method includes deleting at least one user profile and corresponding pairing data based on one or more of a pre-determined location and a status of an ignition of the vehicle in a rental mode and deleting the at least one user profile and the corresponding pairing data based on a prompt displayed to a user in a non-rental mode.

18 Claims, 10 Drawing Sheets

(56) References Cited

U.S. PATENT DOCUMENTS

| | | | | |
|---|---|---|---|---|
| 2014/0240089 A1* | 8/2014 | Chang | ................ | H04B 5/70 |
| | | | | 340/5.61 |
| 2016/0364812 A1 | 12/2016 | Cao | | |
| 2019/0059123 A1* | 2/2019 | Withers | ................ | H04W 76/14 |
| 2019/0202399 A1* | 7/2019 | Troia | ................ | H04W 12/06 |
| 2019/0291719 A1* | 9/2019 | Tiziani | ................ | B60K 35/22 |
| 2019/0316921 A1* | 10/2019 | Osawa | ................ | G08G 1/00 |
| 2020/0074492 A1 | 3/2020 | Scholl et al. | | |
| 2021/0297520 A1* | 9/2021 | Takada | ................ | H04M 1/6091 |
| 2022/0289216 A1* | 9/2022 | Kamiyamaguchi | ... | B60W 50/14 |
| 2024/0021031 A1* | 1/2024 | Schmidt | ................ | H04L 67/125 |

* cited by examiner

SYSTEMS AND METHODS FOR SECURING PRIVATE USER DATA BASED ON GPS

FIELD

The present description relates generally to methods and systems for protecting data privacy and personal information stored in an in-vehicle computing system.

BACKGROUND/SUMMARY

Modern vehicles may include in-vehicle computing systems that store user data in response to a pairing between a mobile computing device and the in-vehicle computing system. In particular, a mobile computing device may be paired with an infotainment system of the vehicle to communicatively couple the mobile computing device and the infotainment system. As a result, the infotainment system may store user data, including personal information, acquired during the pairing. The personal information may include user contacts, phone numbers, personal addresses, financial information, navigation data, home address of the user, and the like.

By storing this personal information in memory of the infotainment system, the user may have easier access to the personal information while operating the vehicle. However, in some cases, this may be disadvantageous. For example, fleet vehicles may be loaned per a vehicle rental organization to a consumer. The fleet may not have an existing method to remove user data for inactive profiles of the users (e.g., the consumers) automatically. As such, the user may have to manually delete the user's inactive profile prior to returning the vehicle to a depot of the vehicle rental organization. The user may forget to manually delete the inactive profile which may enable the personal information to be accessed by a subsequent vehicle operator. In this way, the security of the personal information of the user may be compromised.

In one example, the issues described above may be addressed by a method comprising deleting at least one user profile and corresponding pairing data upon receiving a deletion request, the deletion request received in response to a pre-set trigger, wherein the in-vehicle computing system is configured to operate in a rental mode or a non-rental mode, and wherein the pre-set trigger varies according to the rental mode or the non-rental mode. As such, an integrity of user privacy and data security may be maintained in addition to increasing efficiency of memory storage by deleting user profiles and corresponding pairing data periodically.

In one example, during a first sub-mode of a rental mode of the in-vehicle computing system, location data obtained via one of a mobile computing device communicatively coupled to the in-vehicle computing system or an in-vehicle GPS may be used to determine current vehicle location. A comparison of the current vehicle location and a pre-determined location may indicate whether the current vehicle location is within a distance threshold. The sensitive data may be deleted in response to the current vehicle location being within the distance threshold for a pre-determined amount of time.

In a second sub-mode of the rental mode, the method may include deleting the user profile in response to the vehicle being within a pre-determined location and a vehicle ignition being switched off during the rental mode of the infotainment system. A change in position of an ignition switch to an off position may indicate that the vehicle ignition is being switched off. Accordingly, sensitive data may be deleted after the change in position of the ignition switch to the off position and prior to the vehicle ignition being switched off or after the change in position of the ignition switch to the on position after a first occurrence wherein the in-vehicle computing system receives an alert indicating that the ignition switch and vehicle ignition is being switched off.

In another example, during a non-rental mode of the infotainment system, a user may optionally select to pair a mobile computing device and the in-vehicle computing system via one of a permanent pairing mode and a temporary pairing mode. In the permanent pairing mode, user profiles and pairing data may be deleted upon request by a user. In the temporary pairing mode, user profiles and pairing data may be deleted in response to at least one pre-set trigger of a location selected by the user, an amount of time selected by the user, and a vehicle ignition being switched off.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to systems and methods for deleting a user profile and pairing data stored in an in-vehicle computing system (e.g., infotainment system) in response to receiving a deletion request, which may be received in response to a pre-set trigger. The systems and methods may, in some examples, be implemented when the in-vehicle computing system is configured to operate in a rental mode or non-rental mode of the in-vehicle computing system. In the rental mode, a user may operate a vehicle temporarily, such as when renting a vehicle from a vehicle rental organization. Accordingly, the vehicle is returned to a pre-determined location that is determined prior to vehicle operation by the user (e.g., a depot of the vehicle rental organization). The non-rental mode may include one of the user operating a vehicle permanently or the user being a passenger in the vehicle. As such, the in-vehicle computing system may be configured to operate in a permanent pairing sub-mode of the non-rental mode when the user is operating the vehicle permanently and in temporary pairing sub-mode of the non-rental mode when the user is traveling in the vehicle temporarily and not operating the vehicle.

Figure 1:
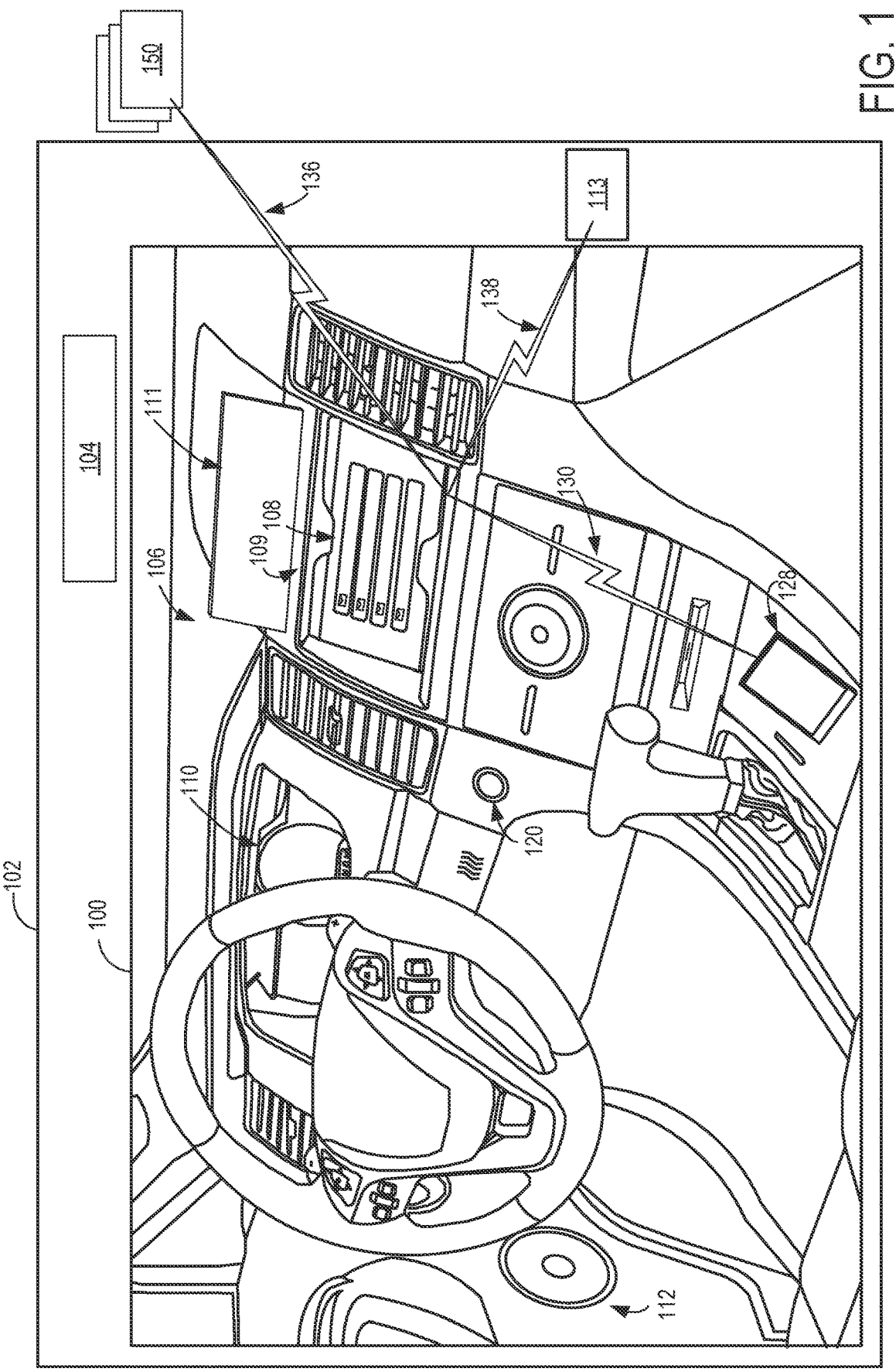
FIG. 1 shows an example partial view of a vehicle cabin in accordance with one or more embodiments of the present disclosure.
Figure 2:
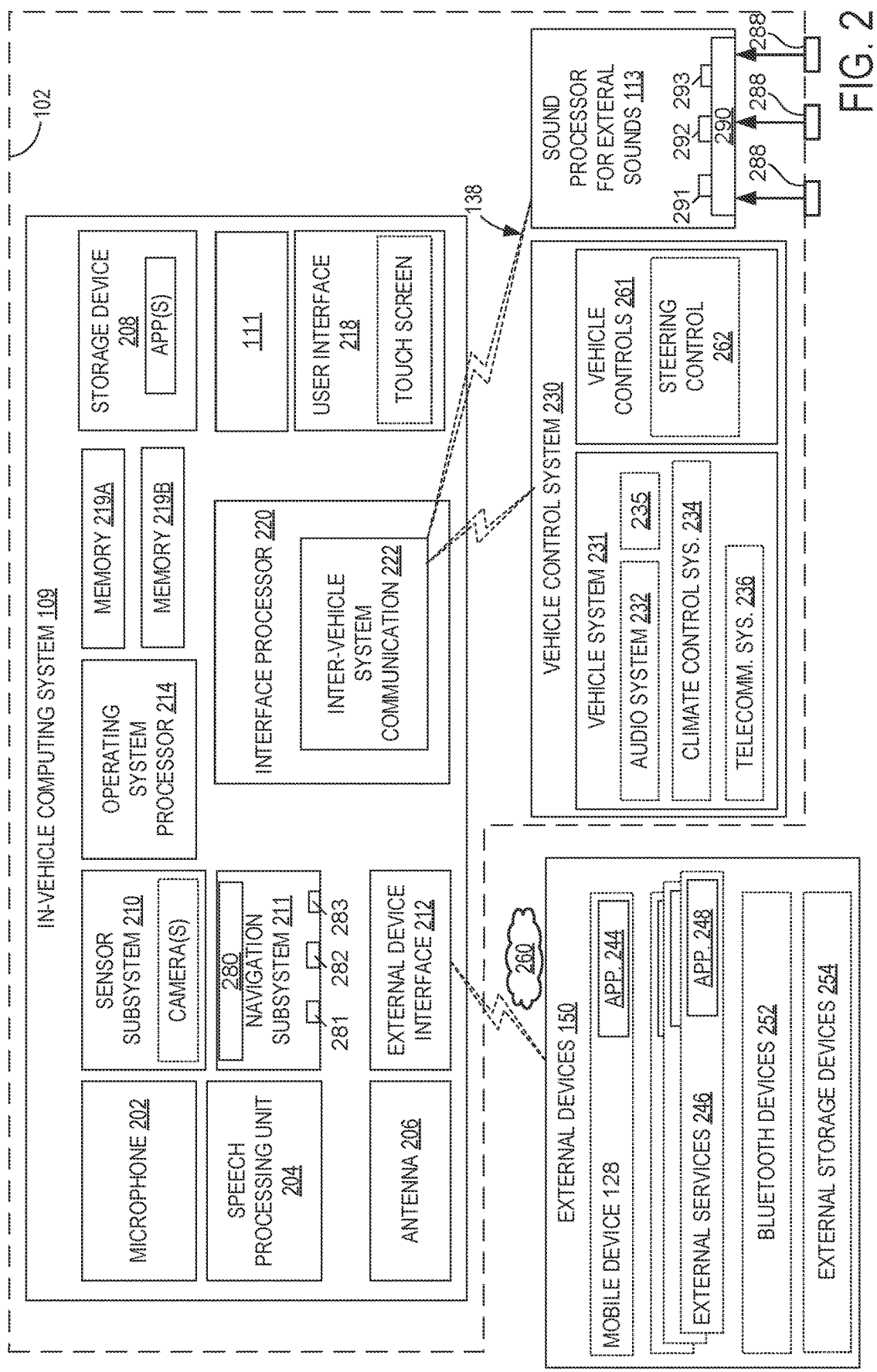
FIG. 2 shows an example in-vehicle computing system in accordance with one or more embodiments of the present disclosure.
Figure 3:
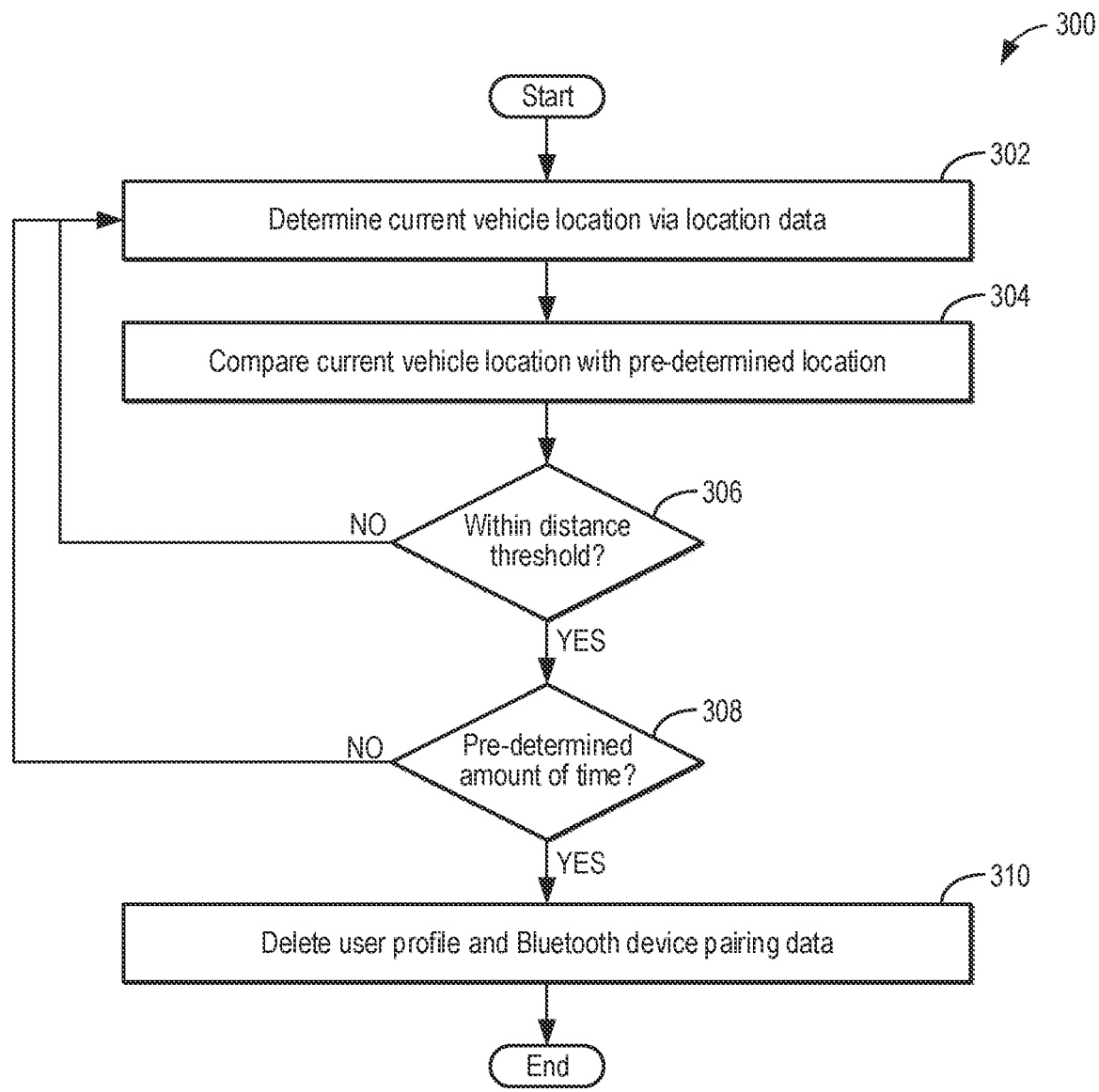
FIG. 3 shows a flow chart illustrating a method that may be implemented according to a first sub mode of a rental mode of the in-vehicle computing system to delete at least one user profile and corresponding pairing data based on a pre-set trigger.
Figure 4:
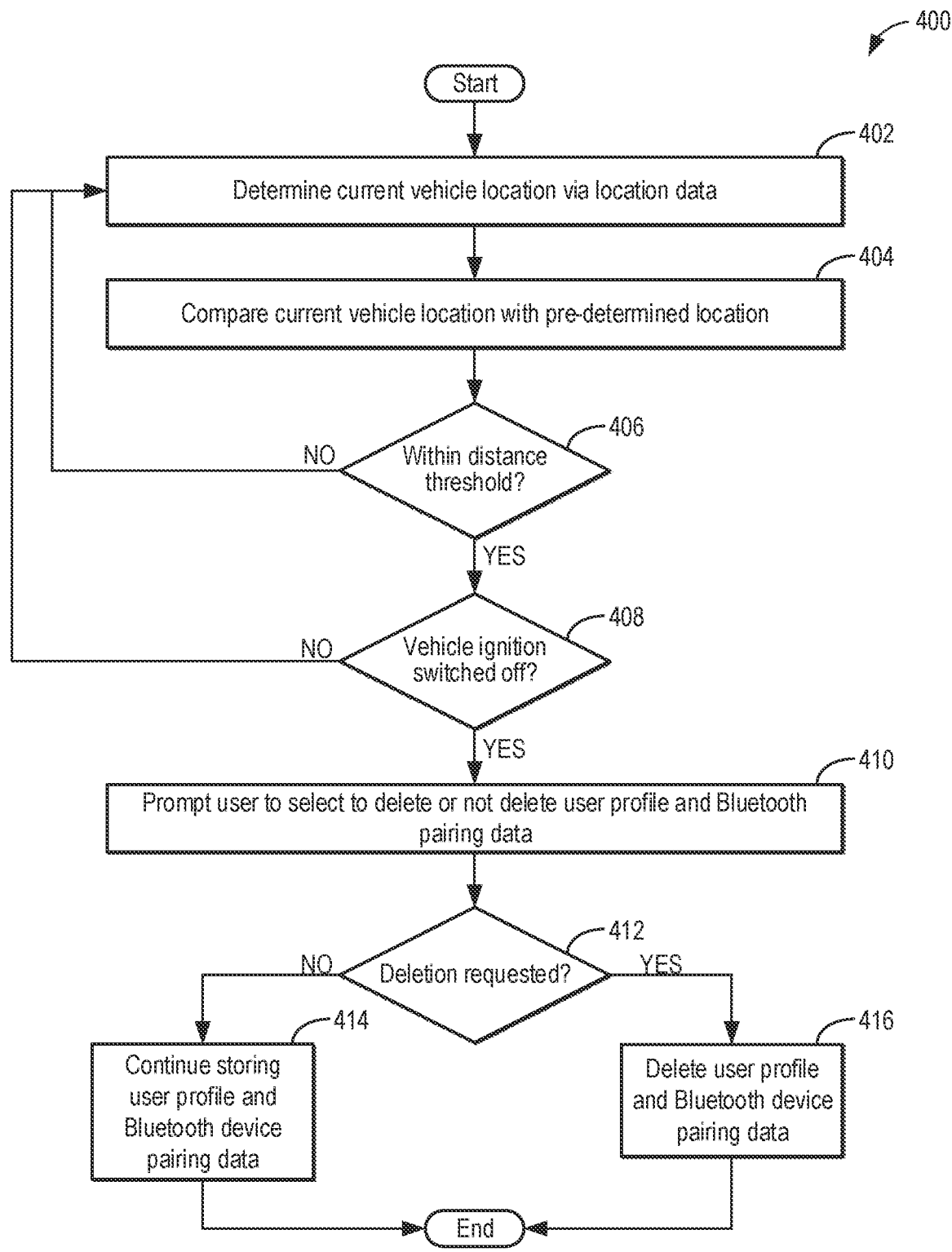
FIG. 4 shows a flow chart illustrating a method that may be implemented according to a second sub-mode of the rental mode of the in-vehicle computing system to delete at least one user profile and corresponding pairing data based on a pre-set trigger.
Figure 5:
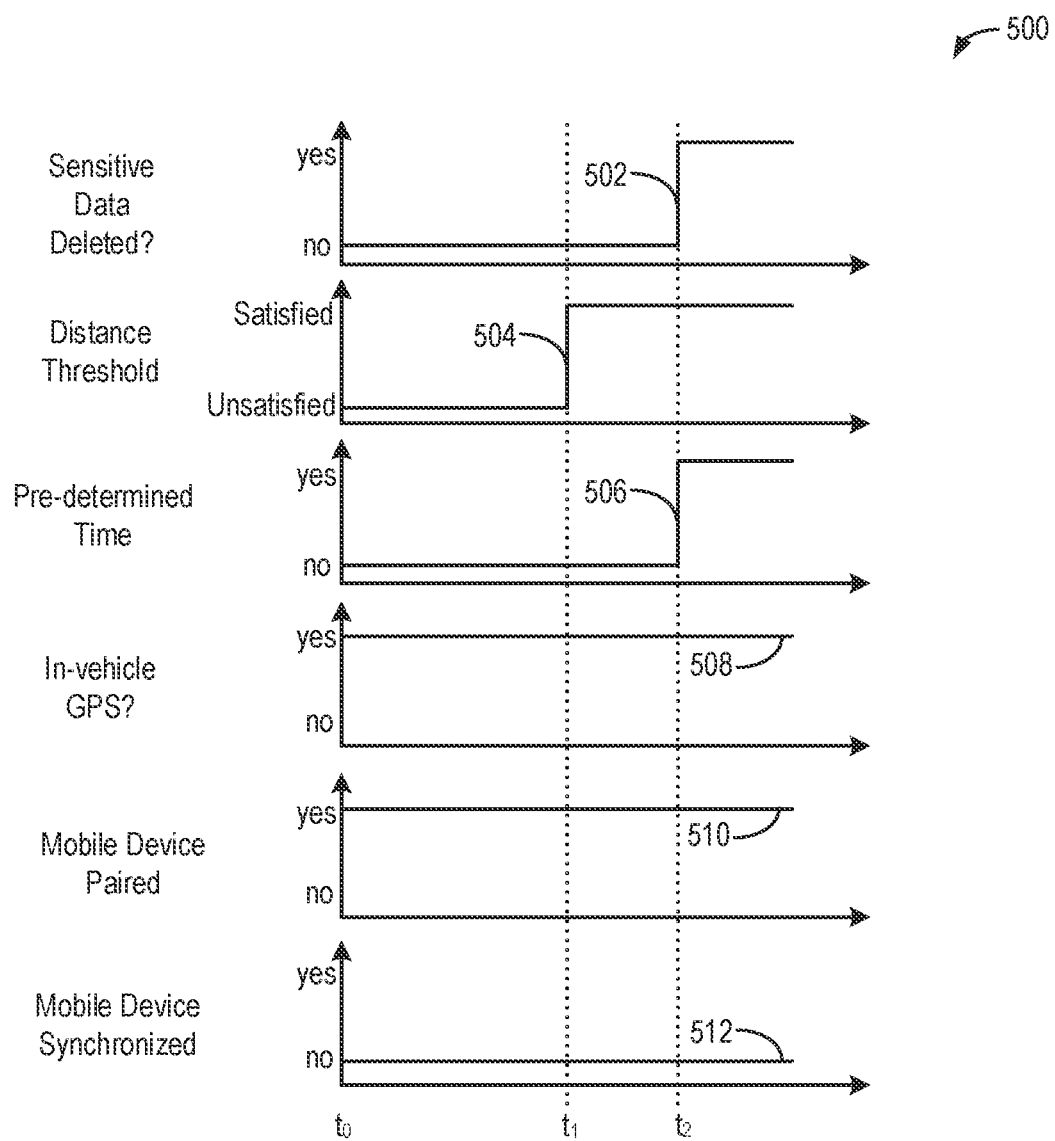
FIG. 5 shows a first example of a timing sequence according to the method described with respect to FIG. 3.
Figure 6:
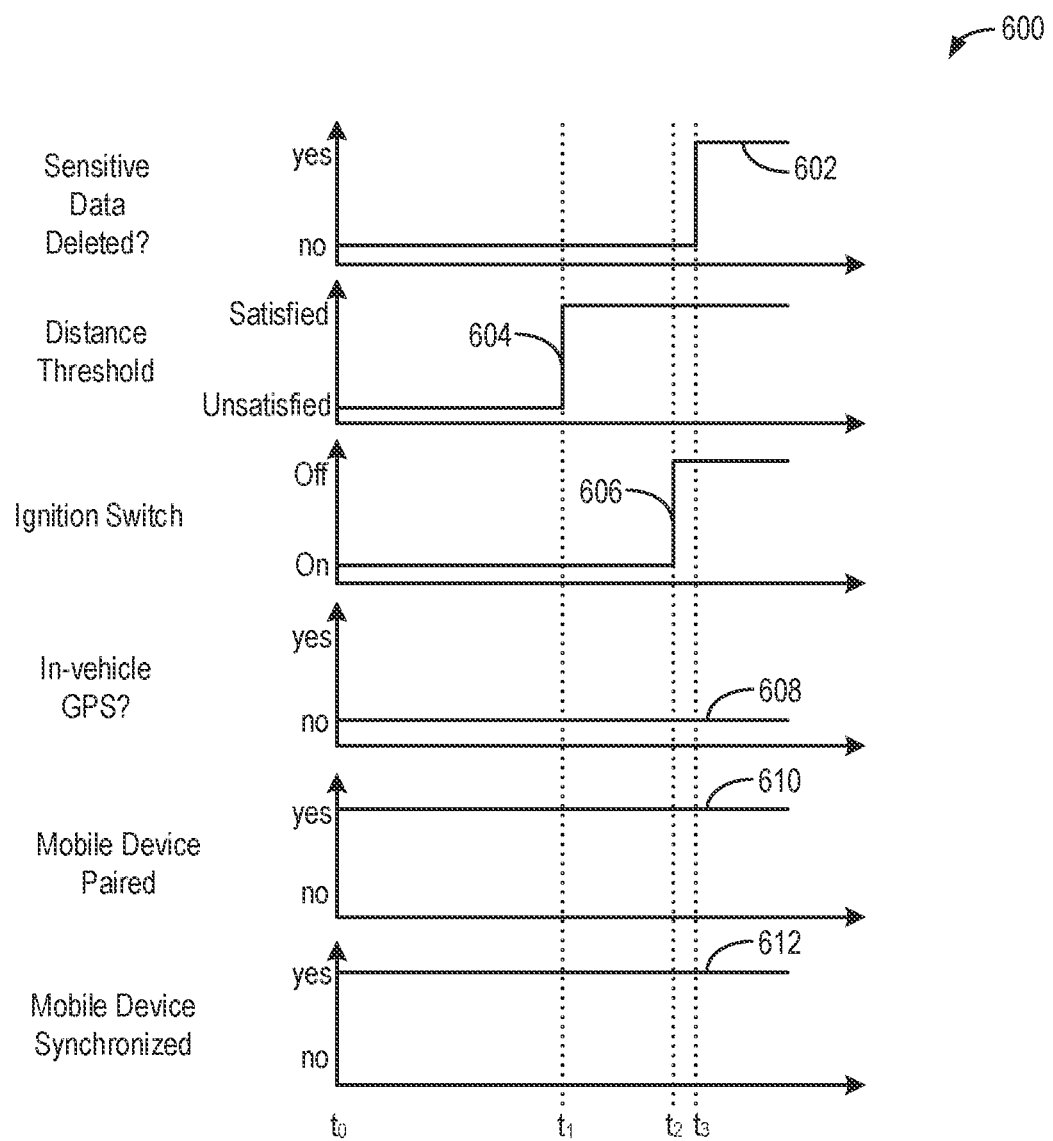
FIG. 6 shows a second example of a timing sequence according to the method described with respect to FIG. 4.
Figure 7:
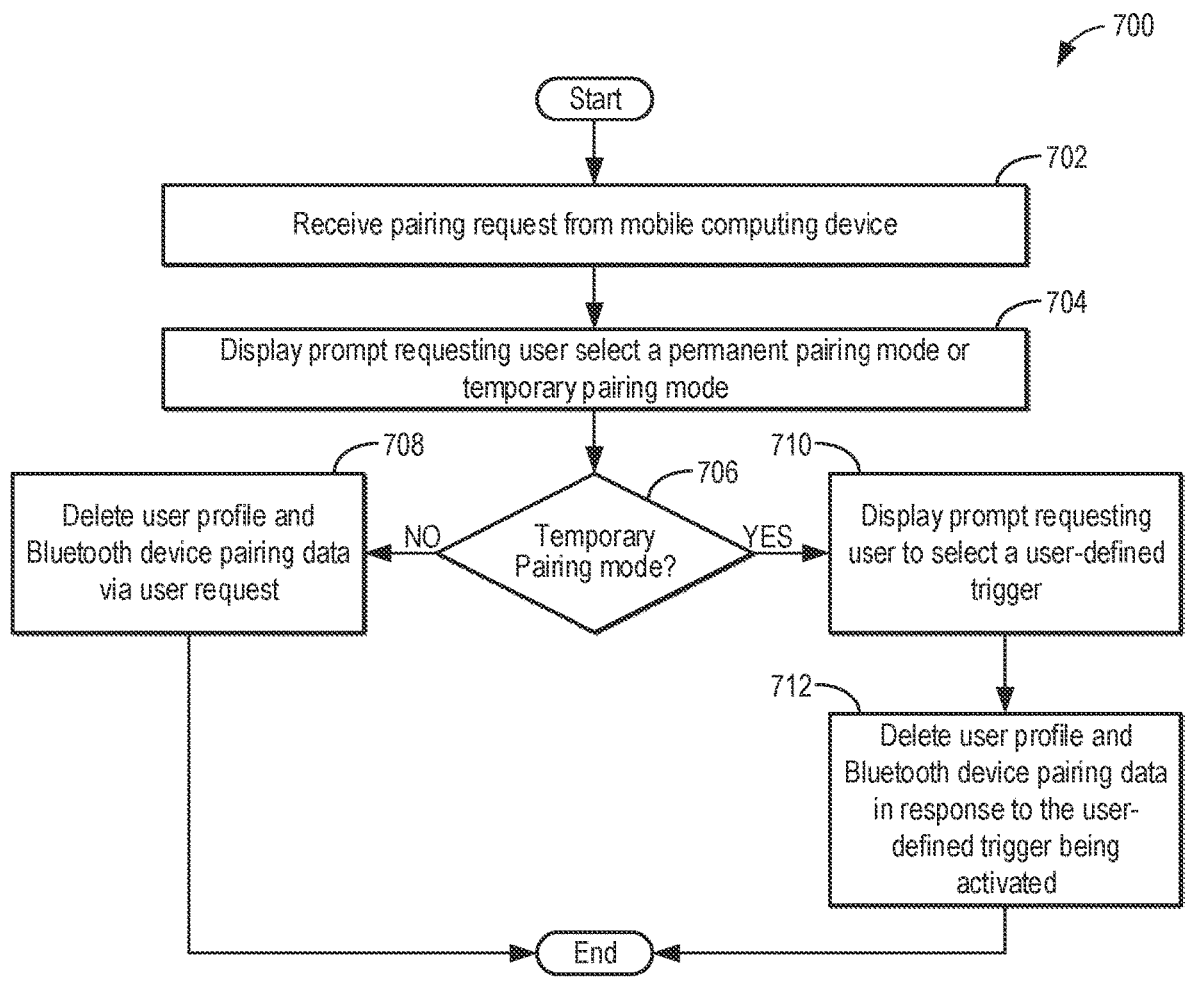
FIG. 7 shows a flow chart illustrating a method that may be implemented during a non-rental mode of the in-vehicle computing system to delete at least one user profile and corresponding pairing data.
Figure 8:
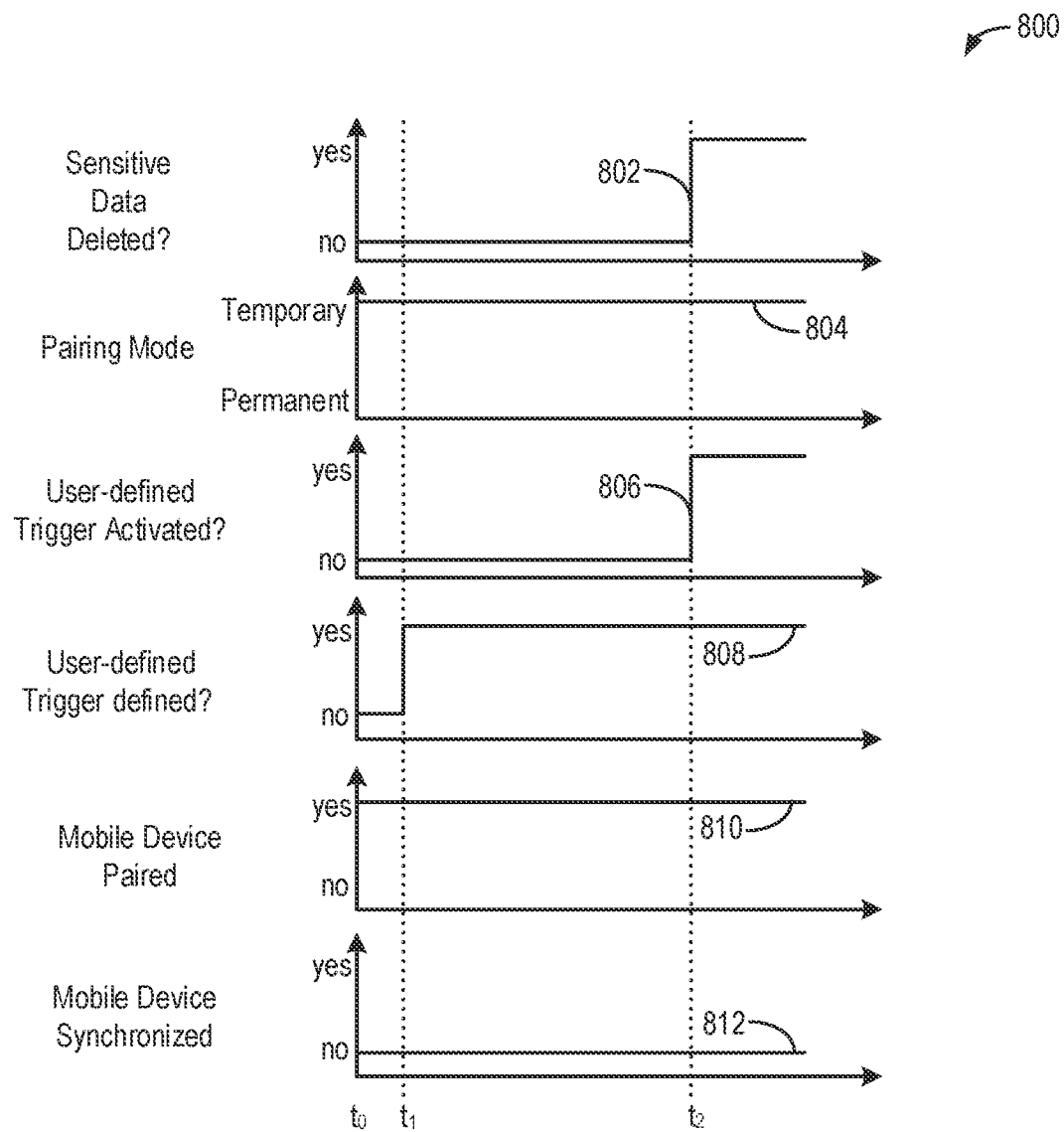
FIG. 8 shows a third example of a timing sequence according to a temporary pairing sub-mode described with respect to FIG. 7.
Figure 9:
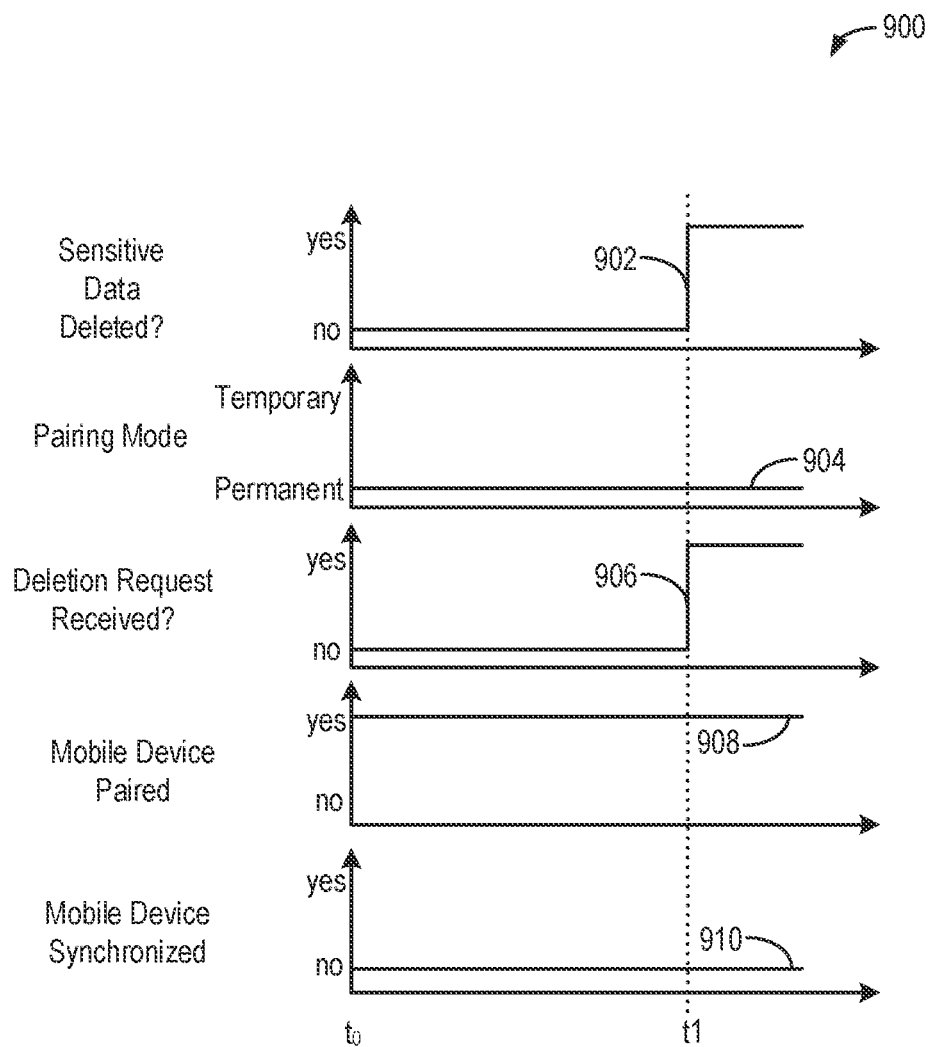
FIG. 9 shows a fourth example of a timing sequence according to a permanent pairing sub-mode described with respect to FIG. 7.
Figure 10:
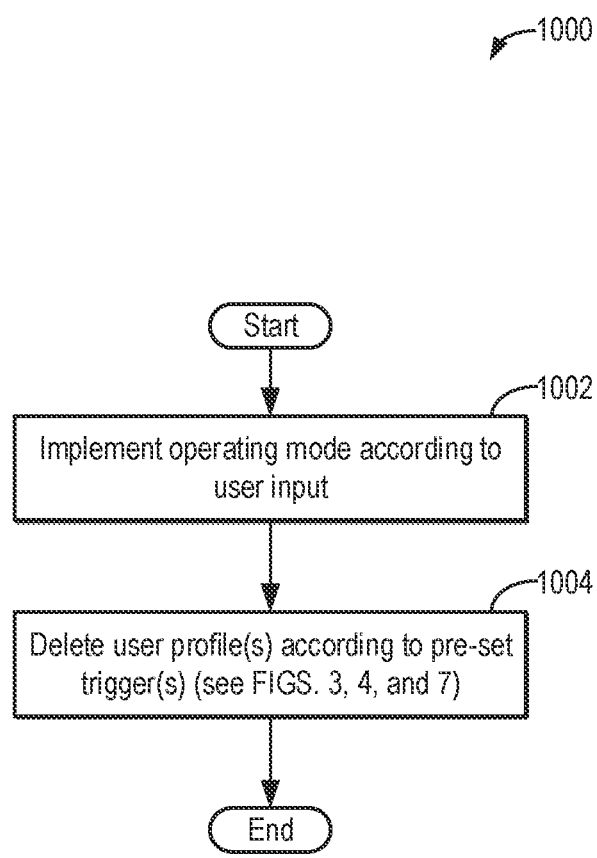
FIG. 10 shows a high-level flow chart illustrating a method that may be implemented to delete at least one user profile and corresponding pairing data in response to receiving deletion requests based on pre-set triggers.

Accordingly, such systems and methods relate to in-vehicle computing systems, such as the in-vehicle computing system located in a vehicle cabin of FIG. 1. FIG. 2 provides details of the in-vehicle computing system. FIG. 3 depicts a method for deleting sensitive data in response to a vehicle being within a pre-determined location for a pre-determined amount of time during a rental mode. As shown in FIG. 4, sensitive data may be deleted in response to the vehicle being within a pre-determined location and a vehicle ignition switching off during the rental mode. FIG. 5 illustrates a timing diagram for deleting sensitive information based on the pre-determined location and time during a rental mode. FIG. 6 depicts a timing diagram for deleting sensitive information based on the pre-determined location and vehicle ignition being switched off during a rental mode. FIG. 7 depicts a method for deleting sensitive data in response to a user-defined trigger being satisfied during a non-rental mode. FIG. 8 depicts a timing diagram for deleting sensitive information based on a user-defined trigger during a temporary pairing sub-mode of a non-rental mode. FIG. 9 depicts a timing diagram for deleting sensitive information based on a user-defined trigger during a permanent pairing sub-mode of a non-rental mode. A high-level method for deleting at least one user profile and corresponding pairing data is shown in FIG. 10.

FIG. 1 shows an example partial view of a cabin 100 of a vehicle 102, in which a driver and/or one or more passengers may be seated. Vehicle 102 of FIG. 1 may be a motor vehicle including drive wheels (not shown) and an internal combustion engine 104. Internal combustion engine 104 may include one or more combustion chambers which may receive intake air via an intake passage and exhaust combustion gases via an exhaust passage.

Vehicle 102 may be a road automobile, among other types of vehicles. In some examples, vehicle 102 may include a hybrid propulsion system including an energy conversion device operable to absorb energy from vehicle motion and/or the engine and convert the absorbed energy to an energy form suitable for storage by an energy storage device. In one example, vehicle 102 may be a fully electric vehicle, incorporating fuel cells, solar energy capturing elements, and/or other energy storage systems for powering the vehicle.

As shown, an instrument panel 106 may include various displays and controls accessible to a human driver (also referred to as the user) of vehicle 102. For example, instrument panel 106 may include a touch screen 108 of an in-vehicle computing system 109 (e.g., an infotainment system), an audio system control panel, and an instrument cluster 110. Touch screen 108 may receive user input to the in-vehicle computing system 109 for controlling audio output, visual display output, user preferences, control parameter selection, etc.

While the example system shown in FIG. 1 includes audio system controls that may be performed via a user interface of in-vehicle computing system 109, such as touch screen 108 without a separate audio system control panel, in other embodiments, the vehicle may include an audio system control panel, which may include controls for a conventional vehicle audio system such as a radio, compact disc player, MP3 player, etc. The audio system controls may include features for controlling one or more aspects of audio output via speakers 112 of a vehicle speaker system. For example, the in-vehicle computing system or the audio system controls may control a volume of audio output and/or any other aspect of the audio output. In further examples, in-vehicle computing system 109 may adjust a radio station selection, a playlist selection, a source of audio input (e.g., from radio or CD or MP3), etc., based on user input received directly via touch screen 108, or based on data regarding the user (such as a physical state and/or environment of the user) received via external devices 150 and/or mobile device 128 (or mobile computing device).

In addition, the in-vehicle computing system 109 may adjust audio output volume or power output level, which speakers are activated, and signals for generating sounds at speakers in response to output from sound processor for external sounds 113. The audio system of the vehicle may include an amplifier (not shown) coupled to a plurality of loudspeakers (not shown). The sound processor for external sounds 113 may be connected to the in-vehicle computing system via communication link 138, which may be wired or wireless, as discussed with reference to communication link 130, and configured to provide two-way communication between the sound processor for external sounds 113 and the in-vehicle computing system 109.

In some embodiments, one or more hardware elements of in-vehicle computing system 109, such as touch screen 108, a display screen 111, various control dials, knobs and buttons, memory, processor(s), and any interface elements (e.g., connectors or ports) may form an integrated head unit that is installed in instrument panel 106 of the vehicle. The head unit may be fixedly or removably attached in instrument panel 106. In additional or alternative embodiments, one or more hardware elements of the in-vehicle computing system 109 may be modular and may be installed in multiple locations of the vehicle.

The cabin 100 may include one or more sensors for monitoring the vehicle, the user, and/or the environment. For example, the cabin 100 may include one or more seat-mounted pressure sensors configured to measure the pressure applied to the seat to determine the presence of a user, door sensors configured to monitor door activity, humidity sensors to measure the humidity content of the cabin, microphones to receive user input in the form of voice commands, to enable a user to conduct telephone calls, and/or to measure ambient noise in the cabin 100, etc.

It is to be understood that the above-described sensors and/or one or more additional or alternative sensors may be positioned in any suitable location of the vehicle. For example, sensors may be positioned in an engine compartment, on an external surface of the vehicle, and/or in other suitable locations for providing information regarding the operation of the vehicle, ambient conditions of the vehicle, a user of the vehicle, etc. Information regarding ambient conditions of the vehicle, vehicle status, or vehicle driver may also be received from sensors external to/separate from the vehicle (that is, not part of the vehicle system), such as sensors coupled to external devices 150 and/or mobile device 128.

The cabin 100 may include a push button 120 for a push button ignition. Other embodiments without a push button ignition may rely on an ignition key. The push button 120 or the ignition key may be utilized to adjust the position of an ignition switch. In particular, the push button 120 or the ignition key may switch the ignition switch into an on position or into an off position. A sensor communicatively coupled to the ignition switch may transmit signals to the in-vehicle computing system 109 in response to detecting a change of position of the ignition switch and to alert the in-vehicle computing system 109 that a vehicle ignition is being switched on or off.

Cabin 100 may also include one or more user objects, such as mobile device 128, that are stored in the vehicle before, during, and/or after travelling. The mobile device 128 may include a smart phone, a tablet, a laptop computer, a portable media player, and/or any suitable mobile computing device. The mobile device 128 may be connected to the in-vehicle computing system via communication link 130. The communication link 130 may be wired (e.g., via Universal Serial Bus [USB], Mobile High-Definition Link [MHL], High-Definition Multimedia Interface [HDMI], Ethernet, etc.) or wireless (e.g., via BLUETOOTH, WIFI, WIFI direct, Near-Field Communication [NFC], cellular connectivity, etc.) and configured to provide two-way communication between the mobile device and the in-vehicle computing system. The mobile device 128 may include one or more wireless communication interfaces for connecting to one or more communication links (e.g., one or more of the example communication links described above).

The wireless communication interface may include one or more physical devices, such as antenna(s) or port(s) coupled to data lines for carrying transmitted or received data, as well as one or more modules/drivers for operating the physical devices in accordance with other devices in the mobile device. For example, the communication link 130 may provide sensor and/or control signals from various vehicle systems (such as vehicle audio system, climate control system, etc.) and the touch screen 108 to the mobile device 128 and may provide control and/or display signals from the mobile device 128 to the in-vehicle systems and the touch screen 108. The communication link 130 may also provide power to the mobile device 128 from an in-vehicle power source in order to charge an internal battery of the mobile device.

In-vehicle computing system 109 may also be communicatively coupled to additional devices operated and/or accessed by the user but located external to vehicle 102, such as one or more external devices 150. In the depicted embodiment, external devices are located outside of vehicle 102 though it will be appreciated that in alternate embodiments, external devices may be located inside cabin 100. The external devices may include a server computing system, personal computing system, portable electronic device, electronic wrist band, electronic head band, portable music player, electronic activity tracking device, pedometer, smartwatch, GPS system, etc.

External devices 150 may be connected to the in-vehicle computing system via communication link 136 which may be wired or wireless, as discussed with reference to communication link 130, and configured to provide two-way communication between the external devices and the in-vehicle computing system 109. For example, external devices 150 may include one or more sensors and communication link 136 may transmit sensor output from external devices 150 to in-vehicle computing system 109 and touch screen 108. External devices 150 may also store and/or receive information regarding contextual data, user behavior/preferences, operating rules, etc. and may transmit such information from the external devices 150 to in-vehicle computing system 109 and touch screen 108.

In-vehicle computing system 109 may analyze the input received from external devices 150, mobile device 128, the sound processor for external sounds 113, and/or other input sources and select settings for various in-vehicle systems (such as user profiles stored in the in-vehicle computing system), provide output via touch screen 108 and/or speakers 112, communicate with mobile device 128 and/or external devices 150, and/or perform other actions based on the assessment. In some embodiments, all or a portion of the assessment may be performed by the mobile device 128 and/or the external devices 150.

In some embodiments, one or more of the external devices 150 may be communicatively coupled to in-vehicle computing system 109 indirectly, via mobile device 128 and/or another of the external devices 150. For example, communication link 136 may communicatively couple external devices 150 to mobile device 128 such that output from external devices 150 is relayed to mobile device 128. Data received from external devices 150 may then be aggregated at mobile device 128 with data collected by mobile device 128, the aggregated data then transmitted to in-vehicle computing system 109 and touch screen 108 via communication link 130. Similar data aggregation may occur at a server system and aggregated data may then be transmitted to in-vehicle computing system 109 and touch screen 108 via communication link 136/130.

FIG. 2 shows a block diagram 200 of in-vehicle computing system 109 which may be included in vehicle 102, as described above. In-vehicle computing system 109 may perform one or more of the methods described herein, in some embodiments. In some examples, in-vehicle computing system 109 may be a vehicle infotainment system configured to provide information-based media content (audio and/or visual media content, including entertainment content, navigational services, etc.) to a vehicle user to enhance the operator's in-vehicle experience. The vehicle infotainment system may include, or be coupled to, various vehicle systems, sub-systems, hardware components, as well as software applications and systems that are integrated in, or integratable into, vehicle 102 in order to enhance an in-vehicle experience for a driver and/or a passenger.

In-vehicle computing system 109 may include one or more processors including an operating system processor 214 and an interface processor 220. Operating system processor 214 may execute an operating system on in-vehicle computing system 109, and control input/output, display, playback, and other operations of in-vehicle computing system 109. Interface processor 220 may interface with a vehicle control system 230 and the sound processor for external sounds 113 via an inter-vehicle system communication 222. Inter-vehicle system communication 222 may output data to other vehicle systems 231 and vehicle controls 261, while also receiving data input from other vehicle systems 231 and vehicle controls 261, e.g. by way of vehicle control system 230. When outputting data, inter-vehicle system communication 222 may provide a signal via a bus corresponding to any status of the vehicle, the vehicle surroundings, or the output of any other information source connected to the vehicle.

Vehicle data outputs may include, for example, analog signals (such as current velocity), digital signals provided by individual information sources (such as clocks, thermometers, location sensors such as Global Positioning System [GPS] sensors, etc.), digital signals propagated through vehicle data networks (such as an engine CAN bus through which engine related information may be communicated, a climate control CAN bus through which climate control related information may be communicated, and a multimedia data network through which multimedia data is communicated between multimedia components in the vehicle). For example, the in-vehicle computing system 109 may retrieve from the engine CAN bus the current speed of the vehicle estimated by the wheel sensors, a power state of the vehicle via a battery and/or power distribution system of the vehicle, an ignition state of the vehicle, etc. In addition, other interfacing means such as Ethernet may be used as well without departing from the scope of this disclosure.

A non-volatile storage device 208 may be included in in-vehicle computing system 109 to store data such as instructions executable by operating system processor 214 and interface processor 220 in non-volatile form. The storage device 208 may store application data, including prerecorded sounds, to enable in-vehicle computing system 109 to run an application for connecting to a cloud-based server and/or collecting information for transmission to the cloud-based server. The application may retrieve information gathered by vehicle systems/sensors (e.g., sensor communicatively coupled to ignition switch), input devices (e.g., user interface 218), data stored in a volatile memory 219A or a non-volatile storage device (e.g., memory) 219B, devices in communication with the in-vehicle computing system (e.g., a mobile computing device connected via a Bluetooth link), etc. In-vehicle computing system 109 may further include volatile memory 219A. Volatile memory 219A may be random access memory (RAM).

Non-transitory storage devices, such as non-volatile storage device 208 and/or non-volatile memory 219B, may store instructions and/or code that, when executed by a processor (e.g., operating system processor 214 and/or interface processor 220), controls in-vehicle computing system 109 to perform one or more of the actions described in the disclosure. For example, computer readable instructions may be stored that cause the processor to operate in-vehicle computing system 109 in a rental mode or a non-rental mode wherein a deletion request may be received in response to a pre-set trigger being activated, such as a location, amount of time, and/or a vehicle ignition being switched off.

In particular, during the rental mode, the instructions may cause the processor to delete at least one user profile and corresponding pairing data according to a first sub-mode or second sub-mode of the rental mode. When operating in the first sub-mode, the user profile and corresponding pairing data may be deleted in response to a vehicle being located within a pre-determined location for a pre-determined amount of time. In the second sub-mode, at least one user profile and corresponding pairing data may be deleted in response to a vehicle being located within a pre-determined location and the vehicle ignition being switched off. In particular, the computer readable instructions may utilize signals received from a sensor monitoring the ignition switch to determine the status of the vehicle ignition and whether the vehicle ignition is being switched off.

As another example, during the non-rental mode, the in-vehicle computing system may be configured to operate according to a permanent pairing sub-mode or a temporary pairing sub-mode. In the permanent pairing sub-mode, the instructions may cause the processor to delete at least one user profile and the corresponding pairing data in response to the user manually deleting the user profile and corresponding pairing data. In the temporary pairing sub-mode, the instructions may cause the processor to delete the user profile or pairing data in response to a user-defined trigger being activated. Further details of the modes and sub-modes of operation are provided below, with reference to FIGS. 3-10.

A microphone 202 may be included in the in-vehicle computing system 109 to receive voice commands from a user, to measure ambient noise in the vehicle, to determine whether audio from speakers of the vehicle is tuned in accordance with an acoustic environment of the vehicle, etc. A speech processing unit 204 may process voice commands, such as the voice commands received from the microphone 202. In some embodiments, in-vehicle computing system 109 may also be able to receive voice commands and sample ambient vehicle noise using a microphone included in an audio system 232 of the vehicle.

One or more additional sensors may be included in a sensor subsystem 210 of the in-vehicle computing system 109. For example, sensor subsystem 210 may include a camera, such as a rear view camera for assisting a user in parking the vehicle). Sensor subsystem 210 of in-vehicle computing system 109 may communicate with and receive inputs from various vehicle sensors and may further receive user inputs. For example, the inputs received by sensor subsystem 210 may include transmission gear position, transmission clutch position, gas pedal input, brake input, transmission selector position, vehicle speed, engine speed, mass airflow through the engine, ambient temperature, intake air temperature, etc., as well as inputs from climate control system sensors (such as heat transfer fluid temperature, antifreeze temperature, fan speed, passenger compartment temperature, desired passenger compartment temperature, ambient humidity, etc.), an audio sensor detecting voice commands issued by a user, a fob sensor receiving commands from and optionally tracking the geographic location/proximity of a fob of the vehicle, etc. While certain vehicle system sensors may communicate with sensor subsystem 210 alone, other sensors may communicate with both sensor subsystem 210 and vehicle control system 230, or may communicate with sensor subsystem 210 indirectly via vehicle control system 230.

A navigation subsystem 211 of in-vehicle computing system 109 may generate and/or receive navigation information such as location information (e.g., via a GPS sensor and/or other sensors from sensor subsystem 210), route guidance, traffic information, point-of-interest (POI) identification, and/or provide other navigational services for the driver. Navigation subsystem 211 may include inputs/outputs 280, including analog to digital converters, digital inputs, digital outputs, network outputs, radio frequency transmitting devices, etc. The sound processor for external sounds 113 may also include a central processing unit 281, volatile memory 282, and non-volatile (e.g., non-transient memory) 283.

External device interface 212 of in-vehicle computing system 109 may be coupleable to and/or communicate with one or more external devices 150 located external to vehicle 102. While the external devices are illustrated as being located external to vehicle 102, it is to be understood that they may be temporarily housed in vehicle 102, such as when the user is operating the external devices while operating vehicle 102. In other words, the external devices 150 are not integral to vehicle 102. The external devices 150 may include a mobile device 128 (e.g., connected via a Bluetooth, NFC, WIFI direct, or other wireless connection) or an alternate Bluetooth device 252. Mobile device 128 may be a mobile phone, smart phone, wearable devices/sensors that may communicate with the in-vehicle computing system via wired and/or wireless communication, or other portable electronic device(s).

Other external devices include external services 246. For example, the external devices may include extra-vehicular devices that are separate from and located externally to the vehicle. Still other external devices include external storage devices 254, such as solid-state drives, pen drives, USB drives, etc. External devices 150 may communicate with in-vehicle computing system 109 either wirelessly or via connectors without departing from the scope of this disclosure. For example, external devices 150 may communicate with in-vehicle computing system 109 through the external device interface 212 over a network 260, a universal serial bus (USB) connection, a direct wired connection, a direct wireless connection, and/or other communication link.

The external device interface 212 may provide a communication interface to enable the in-vehicle computing system to communicate with mobile devices associated with contacts of the driver. For example, the external device interface 212 may enable phone calls to be established and/or text messages (e.g., SMS, MMS, etc.) to be sent (e.g., via a cellular communications network) to a mobile device associated with a contact of the driver. The external device interface 212 may additionally or alternatively provide a wireless communication interface to enable the in-vehicle computing system to synchronize data with one or more devices in the vehicle (e.g., the driver's mobile device) via WIFI direct.

One or more applications may be operable on mobile device 128. As an example, mobile device application 244 may be operated to aggregate user data regarding interactions of the user with the mobile device. For example, mobile device application 244 may aggregate data regarding music playlists listened to by the user on the mobile device, telephone call logs (including a frequency and duration of telephone calls accepted by the user), positional information including locations frequented by the user and an amount of time spent at each location, etc. The collected data may be transferred by mobile device application 244 to the external device interface 212 over network 260. In some embodiments, the collected data may be transferred by mobile device application 244 to the user interface 218 to create a user profile for a plurality of users. The user profile and corresponding pairing data may include sensitive information.

In addition, specific user data requests may be received at mobile device 128 from in-vehicle computing system 109 via the external device interface 212. The specific data requests may include requests for determining where the user is geographically located, an ambient noise level and/or music genre at the user's location, an ambient weather condition (temperature, humidity, etc.) at the user's location, etc. Mobile device application 244 may send control instructions to components (e.g., microphone, amplifier etc.) or other applications (e.g., navigational applications) of mobile device 128 to enable the requested data to be collected on the mobile device or requested adjustment made to the components. Mobile device application 244 may then relay the collected information back to in-vehicle computing system 109.

Likewise, one or more applications may be operable on external services 246. As an example, external services applications 248 may be operated to aggregate and/or analyze data from multiple data sources. For example, external services applications 248 may aggregate data from one or more social media accounts of the user, data from the in-vehicle computing system (e.g., sensor data, log files, user input, etc.), data from an internet query (e.g., weather data, POI data), etc. The collected data may be transmitted to another device and/or analyzed by the application to determine a context of the driver, vehicle, and environment and perform an action based on the context (e.g., requesting/sending data to other devices).

Vehicle control system 230 may include controls for controlling aspects of various vehicle systems 231 involved in different in-vehicle functions. These may include, for example, controlling aspects of audio system 232 for providing audio entertainment to the vehicle occupants, aspects of climate control system 234 for meeting the cabin cooling or heating needs of the vehicle occupants, as well as aspects of telecommunication system 236 for enabling vehicle occupants to establish telecommunication linkage with others.

Audio system 232 may include one or more acoustic reproduction devices including electromagnetic transducers such as speakers 235. Audio system 232 may be passive or active such as by including a power amplifier. In some examples, in-vehicle computing system 109 may be the only audio source for the acoustic reproduction device or there may be other audio sources that are connected to the audio reproduction system (e.g., external devices such as a mobile phone). The connection of any such external devices to the audio reproduction device may be analog, digital, or any combination of analog and digital technologies.

Climate control system 234 may be configured to provide a comfortable environment within the cabin or passenger compartment of vehicle 102. Climate control system 234 includes components enabling controlled ventilation such as air vents, a heater, an air conditioner, an integrated heater and air-conditioner system, etc. Other components linked to the heating and air-conditioning setup may include a windshield defrosting and defogging system capable of clearing the windshield and a ventilation-air filter for cleaning outside air that enters the passenger compartment through a fresh-air inlet.

Vehicle control system 230 may also include controls for adjusting the settings of various vehicle controls 261 (or vehicle system control elements) related to the engine and/or auxiliary elements within a cabin of the vehicle, such as steering wheel controls 262 (e.g., steering wheel-mounted audio system controls, cruise controls, windshield wiper controls, headlight controls, turn signal controls, etc.), instrument panel controls, microphone(s), accelerator/brake/clutch pedals, a gear shift, door/window controls positioned in a driver or passenger door, seat controls, cabin light controls, audio system controls, cabin temperature controls, etc.

Vehicle controls 261 may also include internal engine and vehicle operation controls (e.g., engine controller module, actuators, valves, etc.) that are configured to receive instructions via the CAN bus of the vehicle to change operation of one or more of the engine, exhaust system, transmission, and/or other vehicle system. The control signals may also control audio output at one or more speakers 235 of audio system 232. For example, the control signals may adjust audio output characteristics such as volume, equalization, audio image (e.g., the configuration of the audio signals to produce audio output that appears to a user to originate from one or more defined locations), audio distribution among a plurality of speakers, etc.

Likewise, the control signals may control vents, air conditioner, and/or heater of climate control system 234. For example, the control signals may increase delivery of cooled air to a specific section of the cabin. Control elements positioned on an outside of a vehicle (e.g., controls for a security system) may also be connected to computing system 109, such as via inter-vehicle system communication 222. The control elements of the vehicle control system may be physically and permanently positioned on and/or in the vehicle for receiving user input. In addition to receiving control instructions from in-vehicle computing system 109, vehicle control system 230 may also receive input from one or more external devices 150 operated by the user, such as from mobile device 128. This allows aspects of vehicle systems 231 and vehicle controls 261 to be controlled based on user input received from the external devices 150.

In-vehicle computing system 109 may further include an antenna 206. Antenna 206 is shown as a single antenna, but may comprise one or more antennas in some embodiments. The in-vehicle computing system may obtain broadband wireless internet access via antenna 206, and may further receive broadcast signals such as radio, television, weather, traffic, and the like. The in-vehicle computing system may receive positioning signals such as GPS signals via one or more antennas 206. In one example, the computer readable instructions described above may utilize signals received from the GPS sensors that receive GPS signals may be utilized to determine a current vehicle location. In this way, the current vehicle location may be compared to a pre-determined location stored in memory of the in-vehicle computing system 109 to determine whether the current vehicle location is within a distance threshold of a pre-defined location or user-defined location.

The in-vehicle computing system may also receive wireless commands via FR such as via antenna(s) 206 or via infrared or other means through appropriate receiving devices. In some embodiments, antenna 206 may be included as part of audio system 232 or telecommunication system 236. Additionally, antenna 206 may provide AM/FM radio signals to external devices 150 (such as to mobile device 128) via the external device interface 212.

One or more elements of the in-vehicle computing system 109 may be controlled by a user via user interface 218. User interface 218 may include a graphical user interface presented on a touch screen, such as touch screen 108 of FIG. 1, and/or user-actuated buttons, switches, knobs, dials, sliders, etc. For example, user-actuated elements may include steering wheel controls, door and/or window controls, instrument panel controls, audio system settings, climate control system settings, and the like. A user may also interact with one or more applications of in-vehicle computing system 109 and mobile device 128 via user interface 218.

In addition to receiving a user's vehicle setting preferences on user interface 218, vehicle settings selected by in-vehicle control system may be displayed to a user on user interface 218. Notifications and other messages (e.g., received messages), as well as navigational assistance, may be displayed to the user on a display of the user interface. User preferences/information and/or responses to presented messages may be performed via user input to the user interface.

Sound processor for external sounds 113 may be electrically coupled to a plurality of microphones 288 that are external to vehicle 102 (e.g., external microphones). However, in other examples, the tasks and functions that may be performed by sound processor for external sounds 113 may be integrated into in-vehicle computing system 109. In addition, external microphones 288 may be in direct electric communication with in-vehicle computing system 109 in such examples. Sound processor for external sounds 113 may include inputs/outputs 290, including analog to digital converters, digital inputs, digital outputs, network outputs, radio frequency transmitting devices, etc. The sound processor for external sounds 113 may also include a central processing unit 291, volatile memory 292, and non-volatile (e.g., non-transient memory) 293.

As described herein, the pairing and synchronization of a mobile computing device to an in-vehicle computing system may compromise user privacy and data security when accessed by an unauthorized user. In particular, user profiles and corresponding pairing data may include sensitive information that may be accessible by an unauthorized user. The systems and methods described herein may help maintain user privacy and data security by deleting at least one user profile and corresponding pairing data in response to receiving a deletion request based on pre-set triggers. The pre-set triggers may include a vehicle being positioned in a particular location, an amount of time, a vehicle ignition being switched off, and the like. Various components of the systems described above with respect to FIGS. 1 and 2 may be utilized to detect the pre-set triggers and activate the deletion request, enabling instructions that delete at least one user profile and corresponding pairing data to be executed.

Turning to FIG. 10, a method 1000 for deleting at least one user profile and corresponding pairing data upon receiving a deletion request responsive to a pre-set trigger being activated. The in-vehicle computing system is configured to operate in a rental mode or a non-rental mode where the trigger varies according to the rental mode or the non-rental mode. In this way, active and inactive user profiles and corresponding pairing data may be deleted after the deletion request is received.

The in-vehicle computing system may be the systems described above with respect to FIG. 1 and FIG. 2 but may be carried out with other systems/components without departing from the scope of this disclosure. Instructions for carrying out method 1000, as well as other methods described herein, may be executed by an in-vehicle computing system, such as in-vehicle computing system of FIG. 1, based on instructions stored on at least one memory of the in-vehicle computing system and in conjunction with signals received from GPS sensors communicatively coupled to the navigation subsystem and vehicle ignition sensors communicatively coupled to the in-vehicle computing system, such as the sensors described with reference to FIG. 1

At 1002, the method 1000 includes implementing an operating mode according to user input. In some embodiments, the user input may be received from a system administrator via a user input device. In this way, the in-vehicle computing system may be configured to operate according to the rental mode or the non-rental mode, depending on factors, such as temporary or permanent ownership of the vehicle, and the user acting as an operator or an occupant.

As described herein, in the rental mode, a user may operate a vehicle temporarily, such as when renting a vehicle from a vehicle rental organization. Accordingly, the vehicle is returned to a pre-determined location that is determined prior to vehicle operation by the user (e.g., a depot of the vehicle rental organization or vehicle dealership). When operating in the rental mode, at least one user profile and corresponding pairing data may be deleted based on one or more of a pre-determined location and status of an ignition of the vehicle. During the rental mode, the systems and methods include deleting the user profile and pairing data according to one of a first sub-mode of the rental mode and a second sub-mode of the rental model. A system administrator may configure the in-vehicle computing system to operate in the first sub-mode or the second sub-mode of the rental mode.

The non-rental mode may include one of the user operating a vehicle permanently or the user being a passenger in the vehicle. As such, the in-vehicle computing system may be configured to operate in a permanent pairing sub-mode of the non-rental mode when the user is operating the vehicle permanently and in temporary pairing sub-mode of the non-rental mode when the user is traveling in the vehicle temporarily and not operating the vehicle. For example, when the non-rental mode is operating in accordance with a permanent pairing sub-mode, a user may have permanent ownership of the vehicle and/or the user, either as an occupant or operator, may pair a mobile computing device to a vehicle owned by a trusted person that is not the user. In contrast, when the non-rental mode is operating in accordance with a temporary pairing sub-mode, a user, either as an occupant or operator, may pair a mobile computing device to a vehicle owned by a non-trusted person that is not the user, such as when the user is an occupant in a vehicle owned by a taxi service or other ridesharing service.

At 1004, the method 1000 includes deleting a user profile (s) according to the pre-set trigger(s). User profiles may be generated in response to a mobile computing device pairing and synchronizing to an in-vehicle computing system, such that the in-vehicle computing system may be able recognize the mobile computing device more easily during subsequent synchronizations between the mobile computing device and the in-vehicle computing system. Generation of the user profile may result in storage of pairing data such as the sensitive information referred to herein.

An inactive user profile may comprise a user profile where the mobile computing device that paired with the in-vehicle computing system has not been synchronized with the in-vehicle computing system for a pre-determined period of time. The pre-determined period of time may be referred to as an inactive time threshold. In contrast, an active user profile may comprise a user profile wherein the mobile computing device that paired with the in-vehicle computing system has been synchronized with in-vehicle computing system for a period of time less than the inactive time threshold.

The pre-set triggers may include one or more of a location, an amount of time, and a status of a vehicle ignition. In some embodiments, the pre-set triggers described above may vary in application based on the operating mode of the in-vehicle computing system. Further, activation of the pre-set triggers may result in deletion of an inactive user profiles in some embodiments and deletion of an active user profiles in other embodiments.

As one example, the pre-set trigger in the rental mode may be a pre-determined trigger set when configuring the rental mode of the in-vehicle computing system. Different modes of the rental mode may utilize different pre-determined triggers and/or combinations of pre-determined triggers. In particular, in the first sub-mode of the rental mode, the user profile and pairing data may be deleted in response to a vehicle being located within a pre-determined location for a pre-determined amount of time as described herein with respect to FIG. 3. In the second sub-mode, the user profile and pairing data is deleted in response to the vehicle being located within a pre-determined location and the vehicle ignition being switched off as described herein with respect to FIG. 4.

In some embodiments of the first sub-mode and second sub-mode wherein GPS of a mobile computing device synchronized to the in-vehicle computing system is utilized to determine a current vehicle location, active user profiles may be deleted in response to receiving the deletion request. In other embodiments of the first sub-mode and second sub-mode wherein GPS of the vehicle is utilized to determine the current vehicle location, both active and inactive user profiles may be deleted in response to receiving the deletion request. Alternatively, a default sub-mode of the rental mode may include deleting at least one user profile and corresponding pairing data in response to a default pre-determined trigger being activated, such as after a pre-determined of time (e.g., two weeks) after pairing a mobile computing device and creating the user profile for both inactive and active user profiles. In another example, the default pre-determined trigger may include a pre-determined amount of time within the inactive time threshold, discussed above, for an inactive user profile.

As another example, different modes of the non-rental mode may utilize different pre-set triggers and/or combinations of pre-set triggers. For example, in the permanent pairing sub-mode, the non-rental mode may be configured such that the pre-set trigger is a default manual trigger wherein the user selects to delete at least one user profile and the corresponding pairing data via a user interface of the in-vehicle computing system without being prompted by instructions stored in memory and executed by a processor of the in-vehicle computing system. In this way, both active user profile and inactive user profiles may be deleted in response to a deletion request manually initiated by the user.

In contrast, in the temporary pairing sub-mode of non-rental mode, the pre-set trigger may be a user-defined trigger set when a prompt is output to the user and the user selects one or more of the pre-set triggers (e.g. location, time, and vehicle ignition status). Accordingly, an active user profile or inactive user profile may be deleted in response to the user-defined trigger being activated when a temporary pairing sub-mode of the in-vehicle computing system is selected by a user. Alternatively, a default sub-mode of the non-rental mode may include deleting at least one user profile and corresponding pairing data in response to a default pre-determined trigger being activated, such as after a pre-determined of time (e.g., two weeks) after pairing a mobile computing device and creating the user profile for both inactive and active user profiles. In another example, the default pre-determined trigger may include a pre-determined amount of time within the inactive time threshold, discussed above, for an inactive user profile. The method 1000 then ends.

FIG. 3 shows a method 300 for deleting at least one user profile and corresponding pairing data stored in an in-vehicle computing system (e.g., infotainment system) responsive to one or more of a set of pre-determined triggers being activated, such as a vehicle being located within a pre-determined location for a pre-determined amount of time during a first sub-mode of a rental mode of the in-vehicle computing system. As described herein, a system administrator may be able to configure the in-vehicle computing system to operate in the rental mode when operation of the rental mode is appropriate, such as when the vehicle is loaned or rented by a vehicle rental organization or a vehicle dealership. In particular, the system administrator may be able to configure the in-vehicle computing system to operate in the first sub-mode of the rental mode. In some embodiments, the current configuration of the in-vehicle computing system, such as when the vehicle is operating in the rental mode, may be stored in memory and accessed by instructions executed by the in-vehicle computing system to ensure that the vehicle is operating in the correct mode of operation.

The rental mode comprises the user operating a vehicle temporarily and returning the vehicle to the pre-determined location which may be determined and set prior to vehicle operation by the user. The in-vehicle computing system may operate in the rental mode when a vehicle is a vehicle in a rental pool of vehicles. One example of the rental pool of vehicles may include vehicles that can be rented from a vehicle rental organization. Another example of the rental pool of vehicles may include vehicles loaned or leased from a vehicle dealership.

In the method 300, a current vehicle location may be compared to the pre-determined location to determine whether the current vehicle location is within a distance threshold of the pre-determined location for a pre-determined amount of time. The in-vehicle computing system may be the systems described above with respect to FIG. 1 and FIG. 2 but may be carried out with other systems/components without departing from the scope of this disclosure. Instructions for carrying out method 300, as well as other methods described herein, may be executed by an in-vehicle computing system, such as in-vehicle computing system of FIG. 1, based on instructions stored on at least one memory of the in-vehicle computing system and in conjunction with signals received from GPS sensors communicatively coupled to the navigation subsystem, such as the sensors described with reference to FIG. 1.

At 302, the method 300 includes determining a current vehicle location via location data. In some embodiments, location data may be obtained via a navigation system of the in-vehicle computing system via GPS. As described herein with respect to FIG. 1 and FIG. 2, GPS sensors comprising one or more antennas may receive GPS signals that may be employed via the navigation system to determine the current vehicle location. In other embodiments, location data may be obtained via an external device, such as a mobile computing device or a Bluetooth device. For example, the mobile computing device may be a smartphone. In other embodiments, location data may be obtained via the mobile computing device or Bluetooth device paired and synchronized to the in-vehicle computing system or infotainment system. The mobile computing device or Bluetooth device may determine the current vehicle locations in various ways, including GPS, Cell-ID, WI-FI and the like.

At 304, the method 300 includes comparing current vehicle location with the pre-determined location. The pre-determined location be stored in at least one memory of the infotainment system. The pre-determined location may be a depot of a vehicle rental organization or a vehicle dealership. Other embodiments of the present disclosure may utilize additional or alternative pre-determined locations than described herein. In this way, computer readable instructions stored in the at least one memory and executed by the at least one processor of the in-vehicle computing system (e.g., infotainment system) may cause the processor to access the pre-determined location in memory where the pre-determined location is stored and compare the current vehicle location with the pre-determined location.

At 306, the method 300 includes determining whether the current vehicle location is within a distance threshold of the pre-determined location. Being within the distance threshold of the pre-determined location may comprise the vehicle being located a pre-determined distance from the pre-determined location. As one example, the distance threshold may comprise a number of miles, such as a value in a range between 0 and 2 miles, or a number of feet, such as a value in a range between 0 and 100 feet. Responsive to the current vehicle location not being within the distance threshold, the method 300 returns to 302 to determine the current vehicle location via location data. The method 300 may continue to determine the current vehicle location and compare the current vehicle location with the pre-determined location until the current vehicle location is within the distance threshold.

Responsive to the current vehicle location being within the distance threshold, the method 300 includes determining whether the vehicle remains within the pre-determined location for a pre-determined amount of time at 308. The pre-determined amount of time may include a time threshold wherein the pre-determined amount of time includes a value in a range between a first time and a second time. As one example, the pre-determined amount of time may include a value in a range between 5 minutes and 10 minutes. As another example, the pre-determined amount of time may include a value in a range between 1 and 2 hours.

In some embodiments of the present disclosure, longer time periods may be selected to prevent a situation where the vehicle is driven by the pre-determined location during a rental period. In this way, the user profile and pairing device may not be deleted prior to returning the vehicle to the pre-determined location. Additionally, the pre-determined amount of time may be selected to account for situations wherein a user operating the vehicle to and from the pre-determined location is hindered by heavy traffic and the current vehicle location may not change significantly for a period of time. It may be understood that the examples provided are exemplary and do not limit the scope of the present disclosure. The pre-determined amount of time may depart from the examples provided above without departing from the scope of the present disclosure.

Responsive to the vehicle not remaining within the pre-determined location for the pre-determined amount of time, the method 300 includes determining the current vehicle location via location data at 302. The method 300 may continue to determine the current vehicle location and compare the current vehicle location with the pre-determined location until the current vehicle location is within the distance threshold and remains at the pre-determined location for the pre-determined amount of time.

Responsive to the vehicle remaining within the pre-determined location for the pre-determined amount of time, the method 300 includes deleting a user profile and pairing data at 310. Computer readable instructions stored in the at least one memory and executed by the at least one processor cause the processor to delete at least one user profile and pairing data stored in the at least one memory in response to the vehicle being corresponding located within a pre-determined location for the pre-determined amount of time. In some embodiments, an active profile corresponding to a mobile computing device currently paired and synchronized to the in-vehicle computing device is deleted in response to the pre-determined triggers (e.g., pre-determined location and pre-determined amount of time) being activated.

One such example includes when the in-vehicle computing system relies on GPS of the mobile computing device to determine current vehicle location, and the mobile computing device is synchronized to the in-vehicle computing system and therefore, the user profile is active. In other embodiments, at least one or all user profiles and corresponding pairing data is deleted in response to the pre-determined triggers being activated. One such example includes when the in-vehicle computing system relies on the GPS of the vehicle to determine current vehicle location, and the mobile computing device does not have to be synchronized to determine the current vehicle location. In this case, the user profile is inactive. As such, the instructions may delete the most recently active user profile and/or all user profiles and corresponding pairing data.

The user profile may comprise user data stored in at least one memory of the in-vehicle computing system that compromises data security when accessed by an unauthorized user without the original user's consent. The unauthorized user may include a different user with a different user profile and user data than the user profile and user data stored in the in-vehicle computing system. By not deleting the user profile and pairing data, the unauthorized user may be able to access the sensitive data of other users stored in at least one memory of the infotainment system. Accessing the sensitive information may compromise user privacy and data security.

User data may include sensitive data, including personal information of the user. Similarly, pairing data may deliver sensitive data or personal information acquired from the mobile computing device to the in-vehicle computing system (e.g., infotainment system) upon pairing and synchronization. For example, sensitive data may include phone numbers, user contacts, financial information, personal addresses, navigation data, passwords, and the like. Financial information may include bank account information or a credit card number of the user. Personal addresses may include business addresses, home addresses, and other private addresses. Navigational data may include locations the user has driven to and from. The examples provided are exemplary and sensitive data is not limited to the examples described above. Other embodiments of the present disclosure may include additional types of sensitive data. The method 300 then ends.

Turning to FIG. 4, a method 400 for deleting at least one user profile and corresponding pairing data stored in an in-vehicle computing system (e.g., infotainment system) responsive to one or more of a set of pre-determined triggers being activated, such as a vehicle being located within a pre-determined location and a vehicle ignition being switched off during a second sub-mode of a rental mode of the in-vehicle computing system. As described herein, a system administrator may be able to configure the in-vehicle computing system to operate in the rental mode when operation of the rental mode is appropriate, such as when the vehicle is loaned or rented by a vehicle rental organization or a vehicle dealership. In particular, the system administrator may be able to configure the in-vehicle computing system to operate in the second sub-mode of the rental mode. In some embodiments, the current configuration of the in-vehicle computing system, such as when the vehicle is operating in the rental mode, may be stored in memory and accessed by instructions executed by the in-vehicle computing system to ensure that the vehicle is operating in the correct mode of operation.

The rental mode comprises the user operating a vehicle temporarily and returning the vehicle to a pre-determined location determined prior to vehicle operation by the user. The in-vehicle computing system may operate in the rental mode when a vehicle is a vehicle in a rental pool of vehicles. One example of the rental pool of vehicles may include vehicles that can be rented from a vehicle rental organization. Another example of the rental pool of vehicles may include vehicles loaned or leased from a vehicle dealership.

In the method 400, a current vehicle location may be compared to the pre-determined location to determine whether the current vehicle location is within a distance threshold of the pre-determined location and the vehicle ignition is being switched off. The in-vehicle computing system may be the systems described above with respect to FIG. 1 and FIG. 2 but may be carried with other systems/components without departing from the scope of this disclosure. Instructions for carrying out method 400 may be executed by an in-vehicle computing system, such as in-vehicle computing system of FIG. 1, based on instructions stored on at least one memory of the in-vehicle computing system in conjunction with signals received from sensors of the vehicle ignition system, such as the sensors described with reference to FIG. 1.

At 402, the method 400 includes determining current vehicle location via location data. Current vehicle location may be determined based on location data obtained according to the methods described above with respect to FIG. 3. As one example, a mobile computing device and the in-vehicle computing system (e.g., infotainment system) may be communicatively coupled. As such, location data may be obtained via a mobile computing device paired and synchronized to the in-vehicle computing system. As another example, location data may be obtained via the in-vehicle computing system via GPS. After acquiring the location data, the current vehicle location data may be obtained.

At 404, the method 400 includes comparing the current vehicle location with the pre-determined location. As described above with respect to FIG. 3 the pre-determined location (e.g., a depot of a vehicle rental organization or vehicle dealership) may be stored in at least one memory of the infotainment system. In this way, computer readable instructions stored in the at least one memory and executed by the at least one processor of the in-vehicle computing system (e.g., infotainment system) may cause the processor to access the address in memory wherein the pre-determined location is stored and compare the current vehicle location with the pre-determined location.

At 406, the method 400 includes determining whether the current vehicle location is within a distance threshold of the pre-determined location. As described above, being within the distance threshold of the pre-determined location may comprise the vehicle being located a pre-determined distance from the pre-determined location. As one example, the distance threshold may comprise a number of miles or a number of feet. Responsive to the current vehicle location not being within the distance threshold, the method 400 returns to 402 to determine the current vehicle location via location data. The method 400 may continue to determine the current vehicle location and compare the current vehicle location with the pre-determined location until the current vehicle location is within the distance threshold.

Responsive to the current vehicle location being within the distance threshold, the method 400 includes determining whether the vehicle ignition is being switched off at 408. As described above with respect to FIG. 1 and FIG. 2, a sensor may be communicatively coupled to an ignition switch wherein the position of the ignition switch may be adjusted by a push button (e.g., a push button ignition) or an ignition key to switch the vehicle ignition on or off. In response to detecting a change in position of the ignition switch, the sensor may transmit the signal to the in-vehicle computing system (infotainment system) to alert the in-vehicle computing system when the ignition switch is being switched off or on.

Responsive to the vehicle ignition not being switched off within the pre-determined location, the method 400 returns to 402 to determine the current vehicle location via location data. The method 400 may continue to determine the current vehicle location and compare the current vehicle location with the pre-determined location until the current vehicle location is within the distance threshold and determine whether the vehicle ignition is being switched off.

Responsive to the to the vehicle ignition being switched off within the pre-determined location, the method 400 includes prompting a user to select an option to delete or to not delete user profile and pairing data. In one embodiment, the prompt may be displayed on a user interface of the in-vehicle computing system, such as the user interface of FIG. 2 and the user interface may receive user input (e.g., to delete the user profile) via touchscreen. In another embodiment, the prompt may be displayed on a user interface of the mobile computing device paired and synchronized to the in-vehicle computing system. In this way, the user interface may receive user input via touchscreen regarding the user's selection for deleting or not deleting the user profile and pairing data.

In some embodiments, the user may be prompted to delete an active profile corresponding to a mobile computing device currently paired and synchronized to the in-vehicle computing device is deleted in response to the pre-determined triggers (e.g., pre-determined location and pre-determined amount of time) being activated. One such example includes when the in-vehicle computing system relies on GPS of the mobile computing device to determine current vehicle location, and the mobile computing device is synchronized to the in-vehicle computing system and therefore, the user profile is active.

In other embodiments, the user may be prompted to delete at least one or all user profiles and corresponding pairing data in response to the pre-determined triggers being activated. One such example includes when the in-vehicle computing system relies on the GPS of the vehicle to determine current vehicle location, and the mobile computing device does not have to be synchronized to determine the current vehicle location. In this case, the user profile is inactive. As such, the user may be prompted to delete the most recently active user profile and/or all user profiles and corresponding pairing data.

Responsive to deletion not being requested by the user, the method 400 includes storing the user profile and pairing data at 414. In some embodiments, a message may be displayed to the user on the user interface of the infotainment system or the mobile computing device to alert the user that the user profile and pairing data was not deleted. In other embodiments, a message may be displayed that alerts the user that by not deleting the profile and pairing data, user privacy and data security may be compromised. In alternative embodiments of the rental mode, a default sub-mode of the rental mode may include deleting at least one user profile and corresponding pairing data in response to a default pre-determined trigger being activated, such as after a pre-determined of time (e.g., two weeks) after pairing a mobile computing device and creating the user profile for both inactive and active user profiles. The method 400 then ends.

Responsive to deletion being requested by the user, the method 400 includes deleting the user profile and pairing data at 416. Computer readable instructions stored in the at least one memory may cause the processor to delete the at least one user profile and corresponding pairing data selected by the user in response to the vehicle being located within the pre-determined location and the vehicle ignition being switched off responsive to receiving an alert indicating that an ignition switch is being switched off.

As one example, the at least one processor may execute instructions stored in the at least one memory that cause the processor to delete the user profile and pairing data in response to a position of the ignition switch being switched to the off position and prior to the vehicle ignition being switched off and the vehicle being powered off As another example, the at least one processor may execute instructions stored in the at least one memory that cause the processor to delete the user profile and pairing data in response to a first occurrence of the ignition switch being switched on after receiving the alert that the ignition switch and vehicle ignition are being switched off and power being supplied to the vehicle. The method 400 then ends.

As shown in FIG. 5, a timing diagram 500 illustrates how deletion of a user profile and pairing data may be conducted according to the method of FIG. 3 during operation of the infotainment system in a first sub-mode of a rental mode. Timing diagram 500 includes plot 502, indicating whether sensitive data has been deleted, over time. Timing diagram 500 further includes plot 504, indicating whether the distance threshold criteria has been satisfied, over time. Timing diagram 500 further includes plot 506, indicating whether the pre-determined amount of time criteria has been satisfied, over time. Timing diagram 500 further includes plot 508 may indicate whether an in-vehicle GPS is available, over time. Timing diagram 500 further includes plot 510, indicating whether a mobile operating device is paired to the in-vehicle computing system, over time. Timing diagram 500 further includes plot 512 may indicate whether the mobile operating device is synchronized to the in-vehicle computing system, over time.

At t0, while not explicitly illustrated it may be understood that a vehicle is being propelled via engine operation. As shown in plot 508, the in-vehicle GPS is available. As such, the vehicle may obtain location data via the in-vehicle GPS to compare to the pre-determined location stored in at least one memory of the infotainment system. The infotainment system of the vehicle is paired to the mobile operating device but not synchronized to the mobile operating device, as depicted in plots 510, 512. The pairing of the mobile operating device may indicate that pairing data and/or a user profile with sensitive data may be stored in at least one memory of the infotainment system. Since the distance threshold is not satisfied (e.g., plot 504) and the vehicle is not located within the distance threshold for the pre-determined amount of time (e.g., plot 506), the sensitive data continues to be stored in at least one memory of the infotainment system as shown in plot 502.

At t1, as shown in plot 504, the distance threshold is satisfied, indicating that the vehicle is located within the distance threshold of the pre-determined location. However, the vehicle is not located within the distance threshold of the pre-determined location for the pre-determined amount of time as depicted in plot 506. As one example, a vehicle operator may be located within the distance threshold without an intent of returning the vehicle to the pre-determined location. For example, depending on the distance threshold, the vehicle operator may position the vehicle within the distance threshold of the pre-determined location when driving to a destination. The pre-determined amount of time criteria may help ensure the user profile and pairing data is not deleted prematurely, which may prevent the user or vehicle operator from repeatedly having to pair and synchronize mobile operating devices unnecessarily. Accordingly, the sensitive data continues to be stored in at least one memory of the infotainment system (e.g., plot 502) while the in-vehicle GPS status (e.g., plot 508), and mobile operating device pairing and synchronization status (e.g., plots 510, 512) are maintained.

At t2, as shown in plot 504, the distance threshold continues to be satisfied. Additionally, the vehicle is located within the distance threshold of the pre-determined location for the pre-determined amount of time as depicted in plot 506. In response to the vehicle being located within the distance threshold of the pre-determined location for the pre-determined amount of time, the sensitive data stored in memory of the infotainment system is deleted as depicted in plot 502. As described herein, the sensitive data may be deleted by executing computer readable instructions stored in at least one memory of the infotainment system via at least one processor. In this way, sensitive data, such as home addresses, financial information, and the like may be deleted to prevent sensitive data from being accessed by an unauthorized user, which may help maintain user privacy and data security.

As shown in FIG. 6, the timing diagram 600 depicted illustrates how deletion of a user profile and pairing data may be conducted according to the method of FIG. 4 during operation of the infotainment system in a second sub-mode of the rental mode. Timing diagram 600 includes plot 602, indicating whether sensitive data has been deleted, over time. Timing diagram 600 further includes plot 604, indicating whether the distance threshold criteria has been satisfied, over time. Timing diagram 600 further includes plot 606, indicating whether the system detects a change in the ignition switch to the on position or off position, over time. Timing diagram 600 further includes plot 608 may indicate whether the in-vehicle GPS is available, over time. Timing diagram 600 further includes plot 610, indicating whether the mobile operating device is paired to an in-vehicle computing system, over time. Timing diagram 600 further includes plot 612 may indicate whether the mobile operating device is synchronized to the in-vehicle computing system, over time.

At t0, while not explicitly illustrated it may be understood that a vehicle is being propelled via engine operation. As shown in plot 608, the vehicle does not include an in-vehicle GPS and has to utilize an alternate way to determine current vehicle location. As such, the vehicle may obtain location data via the mobile computing device to compare to the pre-determined location stored in at least one memory of the infotainment system. The infotainment system of the vehicle is paired to a mobile operating device and synchronized to the mobile operating device, as depicted in plots 610, 612. In this way, the infotainment system, which is communicatively coupled to the mobile computing device, may have access to the location data. The pairing of the mobile operating device may indicate that pairing data and/or a user profile with sensitive data may be stored in at least one memory of the infotainment system. Further, the distance threshold is not satisfied (e.g., plot 604) and the vehicle is not located within the distance threshold of the pre-determined location. Further, the position of the ignition switch does not change to the off position (e.g., plot 606), indicating that the vehicle ignition is not being switched off. Since the distance threshold is not satisfied and the vehicle ignition is not being switched off, the sensitive data continues to be stored in at least one memory of the infotainment system as shown in plot 602.

At t1, as shown in plot 604, the distance threshold is satisfied, indicating that the vehicle is located within the distance threshold of the pre-determined location. However, as depicted in plot 606, the position of the ignition switch did not change to the off position, and thus, the vehicle ignition is not being switched off. Accordingly, the sensitive data continues to be stored in at least one memory of the infotainment system (e.g., plot 602) while the in-vehicle GPS status (e.g., plot 608), and mobile operating device pairing and synchronization status (e.g., plots 610, 612) are maintained.

At t2, as shown in plot 604, the distance threshold continues to be satisfied. Additionally, the position of the ignition switch is changed to the off position, indicating that the vehicle ignition is being switched off as depicted in plot 606. In response to the vehicle being located within the distance threshold of the pre-determined location and the vehicle ignition being switched off, a message may be displayed to the user on one of a user interface of the infotainment system or the mobile computing device prompting the user to select whether to delete the user profile and/or pairing data.

At t3, in response to the user requesting to delete the user profile and/or pairing data, the sensitive data stored in memory of the infotainment system is deleted as depicted in plot 602. As described herein, the sensitive data may be deleted by executing computer readable instructions stored in at least one memory of the infotainment system via at least one processor. In this way, sensitive data, such as home addresses, financial information, and the like may be deleted to prevent sensitive data from being accessed by an unauthorized user, which may help maintain user privacy and data security.

As shown in the timing diagram 600, the sensitive data is deleted prior to the vehicle ignition being switched off, since the deletion process initiates in response to the ignition switch being in the off position. In other embodiments, the sensitive data may be deleted after the vehicle ignition is switched off and a first occurrence of the ignition switch being switched on after receiving the alert that the ignition switch and vehicle ignition are being switched off occurs.

Turning to FIG. 7, a method 700 is shown for deleting a user profile and pairing data stored in an in-vehicle computing system (e.g., infotainment system) responsive to a pre-set trigger during a non-rental mode of an in-vehicle computing system. As described herein, a system administrator may be able to configure the in-vehicle computing system to operate in the non-rental mode when operation of the non-rental mode is appropriate, such as when a user is utilizing a ride-sharing service. In some embodiments, the current configuration of the in-vehicle computing system, such as when the vehicle is operating in the non-rental mode, may be stored in memory and accessed by instructions executed by the in-vehicle computing system to ensure that the vehicle is operating in the correct mode of operation.

The non-rental mode may comprise one of the user operating a vehicle permanently or the user being a passenger in the vehicle. The in-vehicle computing system may be configured to operate in the non-rental mode when for example, a vehicle is privately owned by a user or entity other than a vehicle rental organization or vehicle dealership. One example of vehicles that may operate in the non-rental mode include vehicles that are sold by vehicle rental organization or vehicle dealership for permanent ownership. Another example of vehicles that may operate in the non-rental mode include vehicles that are operated in ride-hailing services, such as Lyft, Uber, taxis, and the like.

In the method 700, in the non-rental mode of the infotainment system, a mobile computing device may be paired according to a permanent pairing mode or a temporary pairing mode of the in-vehicle computing system. The in-vehicle computing system may be the systems described above with respect to FIG. 1 and FIG. 2 but may be carried out with other systems/components without departing from the scope of this disclosure. Instructions for carrying out method 700 may be executed by an in-vehicle computing system, such as in-vehicle computing system of FIG. 1, based on instructions stored on at least one memory of the in-vehicle computing system in conjunction with signals received from sensors of the vehicle system, such as the sensors described with reference to FIG. 1.

At 702, the method 700 includes receiving a pairing request from a mobile computing device. In some embodiments, the pairing request may be initiated by a user utilizing a user interface of the in-vehicle computing system. The user may either select an existing user profile associated with an existing mobile computing device that has been previously paired and synchronized with the in-vehicle computing system or a new user profile associated with a new mobile computing device to pair and synchronize with the in-vehicle computing system.

At 704, the method 700 includes displaying a prompt requesting a user select a permanent pairing mode or temporary pairing mode of the in-vehicle computing system. In some embodiments, the prompt may be output and displayed on a display device, such as the user interface of the in-vehicle computing system. In other embodiments, the prompt may be output and displayed on a different display device, such as the user interface of the mobile computing device.

At 706, the method 700 includes determining whether the user selected the temporary pairing mode. User input may be received at a user input device, such as the user interface with touchscreen of the in-vehicle computing system or mobile computing device. Specifically, the user's selection for pairing a mobile computing device according to the permanent pairing mode or the temporary pairing mode may be received at the user interface.

Responsive to the temporary pairing mode not being selected by the user, the method 700 includes deleting the user profile and pairing data via user request at 708. In particular, the in-vehicle computing system may enter the permanent pairing mode. Once the permanent paring mode is selected, the mobile computing device remains permanently paired to the in-vehicle computing system until, for example, deletion of the user profile for the mobile computing device is manually requested by the user. To elaborate, the user may interact with a user interface with touchscreen capabilities of the in-vehicle computing system and select an option to delete a specific user profile and corresponding pairing data via a user input device, such as the user interface.

Instructions corresponding to deleting user profiles and corresponding pairing data may be executed in response to receiving user input (e.g., a user selecting an option via the user interface to delete the specific user profile and corresponding pairing data selected by the user). As another example, the mobile computing device may remain permanently paired to the in-vehicle computing device unless the user manually adjusts the user profile settings and selects the temporary pairing mode. The method 700 then ends.

Responsive to the temporary pairing mode being selected by the user, the method 700 includes displaying a prompt requesting the user to select a user-defined trigger at 710. The user may select the user-defined trigger, which is a pre-set trigger as described above, and input the selection via the user input device (e.g., user interface of in-vehicle computing system or mobile computing device with touchscreen capabilities). In some embodiments, the user-defined trigger may include one or more of a user-defined location, a user-defined amount of time, a vehicle ignition switching off, etc.

For example, the user-defined trigger may include the user selecting an amount of time where the user profile and pairing data is deleted after the amount of time has passed. The user may select a number of minutes, a number of hours, and the like. In one example, the user-defined trigger may include a vehicle being located within a user-defined location for a user-defined amount of time similar to the method described above with respect to FIG. 3. However, rather than the user-defined location and amount of time being stored in at least one memory of the in-vehicle computing system (infotainment system) permanently during the rental mode of the in-vehicle computing system, the user-defined location and amount of time may be stored in the at least one memory of the in-vehicle computing system temporarily after the user selects and inputs the location and amount of time at the user interface during the non-rental mode. After the user-defined trigger has been activated and at least one user profile and corresponding pairing data has been deleted, instructions executed by the processor may cause the processor to delete the user-defined trigger.

In another example, the user-defined trigger may include a vehicle ignition being switched off. In some embodiments, the user may select the vehicle ignition being switched off at the user interface of the in-vehicle computing device or mobile computing device as the user-defined trigger. In other embodiments, in response to a user not selecting a user-defined trigger, the vehicle ignition being switched off may be a default user-defined trigger. In another example, the user-defined trigger may include a vehicle being located within a user-defined location and the vehicle ignition being switched off, following a protocol similar to the method described above with respect to FIG. 4. However, rather than the user-defined location being stored in at least one memory of the in-vehicle computing system (infotainment system) permanently during the rental mode of the in-vehicle computing system, the user-defined location may be stored in the at least one memory of the in-vehicle computing system temporarily after the user selects and inputs the location at the user interface during the non-rental mode. Similar to above, after the user-defined trigger has been activated and at least one user profile and corresponding pairing data has been deleted, instructions executed by the processor may cause the processor to delete the user-defined trigger.

At 712, the method 700 includes deleting the user profile and pairing data in response to the user-defined trigger being activated. Computer readable instructions stored in the at least one memory may cause the processor to delete the user profile and pairing data in response to the user-defined trigger being activated. The computer readable instructions may monitor various vehicle systems, such as the vehicle ignition and location data from GPS in some examples, to detect when the user-defined trigger is being activated.

In one embodiment, the user profile and pairing data may be deleted after the user-defined amount of time after the mobile computing device is paired but no longer synchronized to the in-vehicle computing system, rendering the user profile inactive. In another embodiment, the user profile and pairing data may be deleted after the user-defined amount of time regardless if the mobile computing device is synchronized (e.g., active user profile) or not synchronized (e.g., inactive user profile) to the in-vehicle computing system. In alternative embodiments, the user profile and pairing data may be deleted in response to the vehicle being located within the user-defined location for the user-defined amount of time after the mobile computing device is paired but no longer synchronized to the in-vehicle computing system (e.g., inactive user profile). In an additional embodiment, the user profile and pairing data may be deleted in response to the vehicle being located within the user-defined location for the user-defined amount of time after the mobile computing device regardless if the mobile computing device is synchronized (e.g., active user profile) or not synchronized (e.g., inactive user profile) to the in-vehicle computing device.

In another embodiment, the user profile and pairing data may be deleted in response to the vehicle ignition being switched off regardless of whether the mobile computing device is synchronized (e.g., active user profile) or not synchronized (e.g., inactive user profile) to the in-vehicle computing system. Further, in another embodiment, the user profile and pairing data may be deleted in response to the vehicle being located within a user-defined location and the vehicle ignition being switched off regardless of whether the mobile computing device is synchronized (e.g., active user profile) or not synchronized (e.g., inactive user profile) to the in-vehicle computing system. The method 700 then ends.

It may be understood that the examples describe herein are exemplary and not absolute. Other embodiments of the present disclosure may depart from the embodiments described herein without departing from the scope of the disclosure. For example, other pre-set triggers may activate deletion of the user profile and pairing data. In particular, a default sub-mode of the non-rental mode may include deleting at least one user profile and corresponding pairing data in response to a default pre-determined trigger being activated, such as after a pre-determined of time (e.g., two weeks) after pairing a mobile computing device and creating the user profile for both inactive and active user profiles.

Turning to FIG. 8, a timing diagram 800 depicts illustrates how deletion of the user profile and pairing data may be conducted according to the method of FIG. 7 during operation of the infotainment system in the non-rental mode, particularly during a temporary pairing mode. Timing diagram 800 includes plot 802, indicating whether sensitive data has been deleted, over time. Timing diagram 800 further includes plot 804, indicating the pairing mode, over time. Timing diagram 800 further includes plot 806, indicating whether the system detects the user-defined trigger being activated, over time. Timing diagram 800 further includes plot 808, which indicates whether the user-defined trigger is defined, over time. Timing diagram 800 further includes plot 810, indicating whether the mobile operating device is paired to the in-vehicle computing system, over time. Timing diagram 800 further includes plot 812 may indicate whether the mobile operating device is synchronized to the in-vehicle computing system, over time.

At t0, while not explicitly illustrated, it may be understood that a vehicle is being propelled via engine operation. As shown in plot 804 and plot 808, the user has selected a temporary mode of the infotainment system and has not defined the user-defined trigger. Therefore, as shown in plot 806, the user-defined trigger has not been activated. The infotainment system of the vehicle is paired to a mobile operating device and synchronized to the mobile operating device, as depicted in plots 810, 812. The pairing of the mobile operating device may indicate that pairing data and/or a user profile with sensitive data may be stored in at least one memory of the infotainment system. Since the user-defined trigger has not been defined or activated, the sensitive data continues to be stored in at least one memory of the infotainment system as shown in plot 802.

At t1, as shown in plot 808, the user-defined trigger has been defined by a user. The user-defined trigger may be one or more of a user-defined amount of time, a user-defined location, a vehicle ignition being switched off, and the like. As shown in plot 806, the user-defined trigger has not been activated. Accordingly, the sensitive data continues to be stored in at least one memory of the infotainment system (e.g., plot 802) while the paring mode (e.g., plot 804), and mobile operating device pairing and synchronization status (e.g., plots 810, 812) are maintained.

At t2, as shown in plot 806, the user-defined triggers is activated. In response to the user-defined trigger being activated, the sensitive data has been deleted (e.g., plot 802). As described herein, the sensitive data may be deleted by executing computer readable instructions stored in at least one memory of the infotainment system via at least one processor. In this way, sensitive data, such as home addresses, financial information, and the like may be deleted to prevent sensitive data from being accessed by an unauthorized user, which may help maintain user privacy and data security.

Turning to FIG. 9, a timing diagram 900 depicts illustrates how deletion of the user profile and pairing data may be conducted according to the method of FIG. 7 during operation of the infotainment system in the non-rental mode, in particular, during a permanent pairing mode. Timing diagram 900 includes plot 902, indicating whether sensitive data has been deleted, over time. Timing diagram 900 further includes plot 904, indicating the pairing mode, over time. Timing diagram 900 further includes plot 906, indicating whether a deletion request has been received from the user, over time. Timing diagram 900 further includes plot 908, indicating whether the mobile operating device is paired to the in-vehicle computing system, over time. Timing diagram 900 further includes plot 910 may indicate whether the mobile operating device is synchronized to the in-vehicle computing system, over time.

At t0, while not explicitly illustrated, it may be understood that a vehicle is being propelled via engine operation. As shown in plots 904 and 906, the user has selected a permanent mode of the infotainment system and the system has not received a deletion request from the user. The infotainment system of the vehicle is paired to a mobile operating device and synchronized to the mobile operating device, as depicted in plots 908, 910. The pairing of the mobile operating device may indicate that pairing data and/or a user profile with sensitive data may be stored in at least one memory of the infotainment system. Since the deletion request has not been received from the user, the sensitive data continues to be stored in at least one memory of the infotainment system as shown in plot 902.

At t1, as shown in plot 906, the infotainment system has received a deletion request from the user. The deletion request may have been received via a user interface of the infotainment system via a user input device, such as a touchscreen functionality of the user interface of the infotainment system. In response to the deletion request being received, the sensitive data has been deleted (e.g., plot 902). As described herein, the sensitive data may be deleted by executing computer readable instructions stored in at least one memory of the infotainment system via at least one processor. In this way, sensitive data, such as home addresses, financial information, and the like may be deleted to prevent sensitive data from being accessed by an unauthorized user, which may help maintain user privacy and data security.

The technical effect of deleting at least one user profile and corresponding pairing data upon receiving a deletion request wherein the deletion request is received in response to a pre-set trigger being activated in an in-vehicle computing system configured to operate in a rental mode or a non-rental mode and wherein the trigger varies according to the rental mode or the non-rental mode is that memory storage may be more efficiently managed. Rather than devoting addresses in memory to inactive user profiles and corresponding pairing data that are rarely used, the addresses may be dedicated to active user profiles and/or recently active user profiles. Additionally, an integrity of user privacy and data security may be maintained by deleting the at least one profile and corresponding pairing data. As such, an unauthorized user may not have access to sensitive data stored in at least one memory of an in-vehicle computing system after deletion of the sensitive data. In this way, data security and user privacy is maintained.

The disclosure also provides support for a method for an in-vehicle computing system of a vehicle, comprising: deleting at least one user profile and corresponding pairing data upon receiving a deletion request, the deletion request received in response to a pre-set trigger, wherein the in-vehicle computing system is configured to operate in a rental mode or a non-rental mode, and wherein the pre-set trigger varies according to the rental mode or the non-rental mode. In a first example of the method, the at least one user profile and corresponding pairing data comprises user data stored in the in-vehicle computing system that compromises data security when accessed by an unauthorized user, the unauthorized user being a different user than a user associated with the at least one user profile and corresponding pairing data. In a second example of the method, optionally including the first example, the pre-set trigger is a pre-determined trigger in the rental mode or user-defined in the non-rental mode, the in-vehicle computing system is an infotainment system, and the pre-set trigger is one or more of a location, an amount of time, and a vehicle ignition being switched off.

In a third example of the method, optionally including one or both of the first and second examples, the rental mode comprises a user operating the vehicle temporarily and returning the vehicle to a pre-determined location that is determined prior to vehicle operation by the user, and the non-rental mode comprises one of the user operating the vehicle permanently or the user being a passenger in the vehicle. In a fourth example of the method, optionally including one or more or each of the first through third examples, the rental mode comprises a first sub-mode and a second sub-mode, and wherein when the in-vehicle computing system is operating in the first sub-mode, the deletion request is received in response to the vehicle being located within the pre-determined location for a pre-determined amount of time, and wherein when the in-vehicle computing system is operating in the second sub-mode, the deletion request is received in response to the vehicle being located within the pre-determined location and a vehicle ignition being switched off.

In a fifth example of the method, optionally including one or more or each of the first through fourth examples, the non-rental mode comprises a permanent pairing mode and a temporary pairing mode, and wherein the in-vehicle computing system is operated in the permanent pairing mode when the user is operating the vehicle permanently, and wherein the in-vehicle computing system is operated in the temporary pairing mode when the user is traveling in the vehicle temporarily and not operating the vehicle. In a sixth example of the method, optionally including one or more or each of the first through fifth examples, the deletion request is received in the temporary pairing mode in response to the user selecting a user-defined trigger and the user-defined trigger being activated.

The disclosure also provides support for a method for managing user data for an in-vehicle computing system of a vehicle comprising: responsive to operation of the in-vehicle computing system in a rental mode, deleting at least one user profile and corresponding pairing data based on one or more of a pre-determined location and a status of an ignition of the vehicle, and responsive to operation of the in-vehicle computing system in a non-rental mode, deleting the at least one user profile and the corresponding pairing data based on a prompt displayed to a user. In a first example of the method, the at least one user profile and corresponding pairing data is deleted in the rental mode in response to a pre-determined trigger being activated, and wherein the pre-determined trigger is the vehicle being located within the pre-determined location for a pre-determined amount of time while operating in a first sub-mode of the rental mode. In a second example of the method, optionally including the first example, the method further comprises: determining a current vehicle location based on location data obtained via a mobile computing device paired and synchronized to the in-vehicle computing system or via a GPS of the in-vehicle computing system, and wherein the vehicle is determined, based on comparison of current vehicle location to the pre-determined location, to be located within the pre-determined location when the current vehicle location is within a distance threshold of the pre-determined location.

In a third example of the method, optionally including one or both of the first and second examples, deleting the at least one user profile and corresponding pairing data based on the one or more of the pre-determined location and the status of the ignition of the vehicle further comprises deleting the at least one user profile and corresponding pairing data in response to the prompt being displayed to the user and the user selecting an option to delete a specific user profile and corresponding pairing data. In a fourth example of the method, optionally including one or more or each of the first through third examples, the prompt is displayed to the user in response to a pre-determined trigger being activated wherein the vehicle being located within the pre-determined location and a vehicle ignition being switched off while the in-vehicle computing system is operating in a second sub-mode of the rental mode. In a fifth example of the method, optionally including one or more or each of the first through fourth examples, the user is prompted to delete a user profile and corresponding pairing data in response to the vehicle ignition being switched off and the vehicle ignition being switched off comprises the in-vehicle computing system communicatively coupled to an ignition switch receiving an alert indicating that the ignition switch is switched off and switching off the vehicle ignition in response.

In a sixth example of the method, optionally including one or more or each of the first through fifth examples, deleting the at least one user profile and the corresponding pairing data based on the prompt displayed to the user comprises deleting the at least one user profile and corresponding pairing data in response to one of the user manually initiating a deletion request of a particular user profile during a permanent pairing mode of the non-rental mode via the prompt displayed to the user or a user-defined trigger being activated wherein the user-defined trigger is set via the prompt displayed to the user during operation of the in-vehicle computing system in a temporary pairing mode of the non-rental mode. In a seventh example of the method, optionally including one or more or each of the first through sixth examples, the method further comprises: deleting the at least one user profile and corresponding pairing data in response to a default pre-determined trigger being activated, the default pre-determined trigger being a pre-determined amount of time, whether the in-vehicle computing system is operating in the rental mode or the non-rental mode.

The disclosure also provides support for a vehicle system, comprising: an infotainment system comprising at least one memory and at least one processor, wherein computer readable instructions stored in the at least one memory and executed by the at least one processor cause the processor to: delete at least one user profile and corresponding pairing data stored in the at least one memory in response to a vehicle being located within a pre-determined location for a pre-determined amount of time when the infotainment system is operating a rental mode, delete the at least one user profile and the corresponding pairing data in response to user input when the infotainment system is operating in a non-rental mode, and delete the at least one user profile and corresponding pairing data, whether the infotainment system is operating in the rental mode or the non-rental mode, in response to a default pre-determined trigger, the default pre-determined trigger being the pre-determined amount of time.

In a first example of the system, the system further comprises: a navigation system comprising GPS, wherein the at least one processor executes further instructions stored in the at least one memory that cause the processor to determine a current vehicle location via the navigation system via GPS and compare the current vehicle location to one of a pre-determined trigger or a user-defined trigger, the pre-determined trigger including the pre-determined location and the user-defined trigger including a user-defined location, and an ignition switch communicatively coupled to the infotainment system to detect a change in a position of the ignition switch and a vehicle ignition being switched off in response to the change in the position of the ignition switch, wherein the at least one processor executes further instructions stored in the at least one memory that cause the processor to delete the at least one user profile and pairing data in response to the vehicle being located within the pre-determined location and receiving an alert indicating that the ignition switch is being switched off during the rental mode of the infotainment system or during a temporary pairing sub-mode of the non-rental mode wherein the user-defined trigger is the vehicle ignition being switched off.

In a second example of the system, optionally including the first example, the infotainment system is communicatively coupled to an external device via pairing and synchronizing, and wherein the external device is a mobile computing device or a Bluetooth device. In a third example of the system, optionally including one or both of the first and second examples, the external device is configured to obtain location data, and wherein the at least one processor executes further instructions stored in the at least one memory that cause the processor to determine a current vehicle location based on location data obtained via the external device.

In a fourth example of the system, optionally including one or more or each of the first through third examples, the system further comprises: a user interface communicatively coupled to the infotainment system, the user interface operating as a user input device and display device, wherein the at least one processor executes further instructions stored in the at least one memory that cause the processor to: enable a system administrator to configure the infotainment system to operate in the rental mode or non-rental mode, during operation in the non-rental mode, display a prompt to a user via the user interface to set an operation mode of the infotainment system to one of a permanent pairing sub-mode and temporary pairing sub-mode of the non-rental mode, delete at least one user profile and corresponding profile in response to receiving a deletion request manually initiated by the user during operation in the permanent pairing sub-mode, and display the prompt to the user via the user interface to set a pre-defined user trigger during the temporary pairing sub-mode of the non-rental mode and receive user input.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an in-vehicle computing system of a vehicle, comprising:
deleting at least one user profile and corresponding pairing data upon receiving a deletion request;
wherein the in-vehicle computing system is configured to operate in a rental mode or a non-rental mode, the rental mode comprising a first sub-mode and a second sub-mode, wherein when the in-vehicle computing system is operating in the first sub-mode, the deletion request is received in response to the vehicle being located within a pre-determined location determined prior to vehicle operation by a user of the vehicle for a pre-determined amount of time, and when the in-vehicle computing system is operating in the second sub-mode, the deletion request is received in response to the vehicle being located within the pre-determined location and a vehicle ignition being switched off.

2. The method of claim 1, wherein the at least one user profile and corresponding pairing data comprises user data stored in the in-vehicle computing system that compromises sensitive information that cannot be accessed by an unauthorized user without compromising user privacy, the unauthorized user being a different user than an authorized user associated with the at least one user profile and corresponding pairing data.

3. The method of claim 1, wherein the in-vehicle computing system is an infotainment system.

4. The method of claim 1, wherein the rental mode comprises the user operating the vehicle temporarily and returning the vehicle to the pre-determined location, and the non-rental mode comprises one of the user operating the vehicle permanently or the user being a passenger in the vehicle.

5. The method of claim 4, wherein the non-rental mode comprises a permanent pairing mode and a temporary pairing mode, and wherein the in-vehicle computing system is operated in the permanent pairing mode when the user is operating the vehicle permanently, and wherein the in-vehicle computing system is operated in the temporary pairing mode when the user is traveling in the vehicle temporarily and not operating the vehicle.

6. The method of claim 5, wherein the deletion request is received in the temporary pairing mode in response to the user selecting a user-defined trigger and the user-defined trigger being activated.

7. A method for managing user data for an in-vehicle computing system of a vehicle comprising:
responsive to operation of the in-vehicle computing system in a rental mode, deleting at least one user profile and corresponding pairing data based on a first deletion request generated as a result of one of the vehicle being located within a pre-determined location for a pre-determined amount of time while operating in a first sub-mode of the rental mode, and the vehicle being located within the pre-determined location and a vehicle ignition being switched off while operating in a second sub-mode of the rental mode; and
responsive to operation of the in-vehicle computing system in a non-rental mode, deleting the at least one user profile and the corresponding pairing data based on a second deletion request received from a user.

8. The method of claim 7, further comprising determining a current vehicle location based on location data obtained via a mobile computing device paired and synchronized to the in-vehicle computing system or via a GPS of the in-vehicle computing system, and wherein the vehicle is determined, based on comparison of current vehicle location to the pre-determined location, to be located within the pre-determined location when the current vehicle location is within a distance threshold of the pre-determined location.

9. The method of claim 7, wherein deleting the at least one user profile and corresponding pairing data based on the second deletion request received from the user further comprises deleting the at least one user profile and corresponding pairing data in response to a first prompt being displayed to the user and the user selecting an option to delete a specific user profile and corresponding pairing data.

10. The method of claim 9, wherein deleting the at least one user profile and corresponding pairing data based on the vehicle being located within the pre-determined location and the vehicle ignition being switched off while operating in the second sub-mode of the rental mode further comprises displaying a second prompt to the user, and receiving the first deletion request from the user in response to the second prompt.

11. The method of claim 10, wherein the user is prompted to delete the at least one user profile and corresponding pairing data in response to the in-vehicle computing system receiving an alert indicating that an ignition switch is switched off.

12. The method of claim 7, wherein deleting the at least one user profile and the corresponding pairing data based on the second deletion request from the user further comprises deleting the at least one user profile and corresponding pairing data in response to one of:
the user manually initiating the second deletion request for a particular user profile during a permanent pairing mode of the non-rental mode in response to a third prompt displayed to the user; or
a user-defined trigger being activated, wherein the user-defined trigger is set via a fourth prompt displayed to the user during operation of the in-vehicle computing system in a temporary pairing mode of the non-rental mode.

13. The method of claim 7, further comprising deleting the at least one user profile and corresponding pairing data in response to a default pre-determined trigger being activated, the default pre-determined trigger being a pre-determined amount of time, whether the in-vehicle computing system is operating in the rental mode or the non-rental mode.

14. A vehicle system, comprising:
an infotainment system comprising at least one memory and at least one processor, wherein computer readable instructions stored in the at least one memory and executed by the at least one processor cause the processor to:
delete at least one user profile and corresponding pairing data stored in the at least one memory in response to a vehicle being located within a pre-determined location for a pre-determined amount of time when the infotainment system is operating a rental mode;

delete the at least one user profile and the corresponding pairing data in response to user input when the infotainment system is operating in a non-rental mode; and delete the at least one user profile and corresponding pairing data, whether the infotainment system is operating in the rental mode or the non-rental mode, in response to a default pre-determined trigger, the default pre-determined trigger being the pre-determined amount of time.

15. The system of claim 14, further comprising:

a navigation subsystem comprising GPS, wherein the at least one processor executes further instructions stored in the at least one memory that cause the processor to determine a current vehicle location via the navigation subsystem via GPS and compare the current vehicle location to one of a pre-determined trigger or a user-defined trigger, the pre-determined trigger including the pre-determined location and the user-defined trigger including a user-defined location; and an ignition switch communicatively coupled to the infotainment system to detect a change in a position of the ignition switch and a vehicle ignition being switched off in response to the change in the position of the ignition switch, wherein the at least one processor executes further instructions stored in the at least one memory that cause the processor to delete the at least one user profile and pairing data in response to the vehicle being located within the pre-determined location and receiving an alert indicating that the ignition switch is being switched off during the rental mode of the infotainment system or during a temporary pairing sub-mode of the non-rental mode wherein the user-defined trigger is the vehicle ignition being switched off.

16. The system of claim 14, wherein the infotainment system is communicatively coupled to an external device via pairing and synchronizing, and wherein the external device is a mobile computing device or a Bluetooth device.

17. The system of claim 16, wherein the external device is configured to obtain location data, and wherein the at least one processor executes further instructions stored in the at least one memory that cause the processor to determine a current vehicle location based on location data obtained via the external device.

18. The system of claim 14, further comprising:

a user interface communicatively coupled to the infotainment system, the user interface operating as a user input device and display device, wherein the at least one processor executes further instructions stored in the at least one memory that cause the processor to:

enable a system administrator to configure the infotainment system to operate in the rental mode or non-rental mode;

during operation in the non-rental mode, display a first prompt to a user via the user interface to set an operation mode of the infotainment system to one of a permanent pairing sub-mode and temporary pairing sub-mode of the non-rental mode;

delete at least one user profile and corresponding profile in response to receiving a deletion request manually initiated by the user during operation in the permanent pairing sub-mode; and display a second prompt to the user via the user interface to set a pre-defined user trigger during the temporary pairing sub-mode of the non-rental mode, and receive user input in response to the second prompt.

* * * * *